(12) United States Patent
Reynolds et al.

(10) Patent No.: US 12,123,947 B2
(45) Date of Patent: Oct. 22, 2024

(54) REAL-TIME AUTONOMOUS WEATHER AND SPACE WEATHER MONITORING

(71) Applicant: Atmospheric & Space Technology Research Associates LLC, Louisville, CO (US)

(72) Inventors: Adam Scott Reynolds, Broomfield, CO (US); Syed Mohammed Irfan Azeem, Louisville, CO (US); Geoffrey Crowley, Lafayette, CO (US)

(73) Assignee: Atmospheric & Space Technology Research Associates LLC, Louisville, CO (US)

( * ) Notice: Subject to any disclaimer, the term of this patent is extended or adjusted under 35 U.S.C. 154(b) by 142 days.

(21) Appl. No.: 17/194,502

(22) Filed: Mar. 8, 2021

(65) Prior Publication Data

US 2021/0364635 A1    Nov. 25, 2021

Related U.S. Application Data

(63) Continuation of application No. 14/909,132, filed as application No. PCT/US2014/049472 on Aug. 1, 2014, now Pat. No. 10,942,270.

(Continued)

(51) Int. Cl.
  *G01S 13/95*    (2006.01)
  *G01S 13/74*    (2006.01)
(Continued)

(52) U.S. Cl.
  CPC .......... *G01S 13/955* (2013.01); *G01S 13/74* (2013.01); *G01S 19/072* (2019.08); *G01S 19/14* (2013.01);
(Continued)

(58) Field of Classification Search
  CPC ........ G01S 13/955; G01S 19/07; G01S 19/14; G01S 19/40; G01W 1/02
  See application file for complete search history.

(56) References Cited

U.S. PATENT DOCUMENTS

| 5,410,481 A | 4/1995 | Kriz |
| 6,285,315 B1 * | 9/2001 | Pratt .................... G01S 19/05 |
| | | 342/357.44 |

(Continued)

FOREIGN PATENT DOCUMENTS

| JP | 2014232087 A * | 5/2013 |
| WO | 2015017824 A2 | 2/2015 |

OTHER PUBLICATIONS

Astra, "Programmable Dual Frequency GPS Receiver for Monitoring Space Weather Cases SM-211 GPS Receiver," Data sheet 2014, 2 pages.

(Continued)

*Primary Examiner* — Mohamed Charioui
*Assistant Examiner* — Lynda Dinh
(74) *Attorney, Agent, or Firm* — Morrison & Foerster LLP

(57) ABSTRACT

A method of calculating ionospheric scintillation includes calculating a motion-corrected perturbation of a GNSS radio signal received by a monitoring device deployed in an oceanic environment. The method includes calculating the $\sigma\Phi$ using the high rate phase of the GNSS signal adjusted by removing the change in distance between the monitoring device and the GNSS satellite. The calculating the $\sigma\Phi$ may further include passing the adjusted high rate phase through a high pass filter to remove a drift motion of the monitoring device. The method further includes calculating the $S_4$ through calculating a tilt angle between the antenna of the monitoring device with the GNSS satellite and adjusting the antenna gain through known gain pattern of the antenna. The (Continued)

wave height of the oceanic environment may be calculated by detrending the antenna height to remove low frequency motion when a high rate position of the monitoring device is calculated.

21 Claims, 24 Drawing Sheets

Related U.S. Application Data

(60) Provisional application No. 61/901,426, filed on Nov. 7, 2013, provisional application No. 61/861,948, filed on Aug. 2, 2013.

(51) Int. Cl.

| | | |
|---|---|---|
| *G01S 19/07* | (2010.01) | |
| *G01S 19/14* | (2010.01) | |
| *G01S 19/40* | (2010.01) | |
| *G01S 19/43* | (2010.01) | |
| *G01S 19/47* | (2010.01) | |
| *G01W 1/02* | (2006.01) | |

(52) U.S. Cl.
CPC .............. *G01S 19/40* (2013.01); *G01S 19/43* (2013.01); *G01S 19/47* (2013.01); *G01W 1/02* (2013.01)

(56) References Cited

U.S. PATENT DOCUMENTS

| | | | |
|---|---|---|---|
| 7,010,060 B2 | 3/2006 | Ledvina et al. | |
| 7,136,751 B2* | 11/2006 | Pinto ...................... | G01S 19/54 |
| | | | 701/472 |
| 7,305,021 B2 | 12/2007 | Ledvina et al. | |
| 7,371,136 B2 | 5/2008 | Hine et al. | |
| 9,625,614 B2* | 4/2017 | Rikoski .................. | G06F 30/00 |
| 2002/0008661 A1* | 1/2002 | McCall .................. | G01S 19/47 |
| | | | 701/472 |
| 2003/0087606 A1 | 5/2003 | Dybdal et al. | |
| 2003/0135327 A1 | 7/2003 | Levine et al. | |
| 2005/0012660 A1 | 1/2005 | Nielsen et al. | |
| 2007/0008216 A1 | 1/2007 | Ganguly et al. | |
| 2008/0174482 A1 | 7/2008 | Watson et al. | |
| 2010/0214168 A1* | 8/2010 | Stucki ................ | H01Q 21/0056 |
| | | | 342/357.77 |
| 2010/0283674 A1 | 11/2010 | Kirk | |
| 2010/0324822 A1 | 12/2010 | Coatantiec et al. | |
| 2011/0004407 A1 | 1/2011 | Tillotson | |
| 2011/0266086 A1 | 11/2011 | Welker et al. | |
| 2012/0086606 A1 | 4/2012 | Mathews et al. | |
| 2013/0069822 A1* | 3/2013 | Wu ....................... | G01S 19/073 |
| | | | 342/357.44 |
| 2014/0292569 A1* | 10/2014 | Wallace ................. | G01S 19/41 |
| | | | 342/357.42 |
| 2015/0234053 A1* | 8/2015 | Psiaki ..................... | H04K 3/90 |
| | | | 342/357.51 |

OTHER PUBLICATIONS

Carrano, et al., "Ionospheric Monitoring with SCINDA," Presentation at IHYAFRICA Space Weather and Education Workshop, Retrieved from the Internet: https://www.yumpu.com/en/document/read/5138386/ionospheric-monitoring-with-scinda, 2007, 46 pages.

Extended European Search Report issued in Application No. EP14832999.8, mailed on Aug. 16, 2017, 11 pages.

GPS Ionospheric Scintillation & TEC Monitor (User's Manual), 6 pages, 2007.

International Preliminary Report issued in Application No. PCT/US2014/049472, mailed on Feb. 2, 2016, 12 pages.

International Search report and Written Opinion issued in International Application No. PCT/US2014/049472, mailed on Jan. 29, 2015, 15 pages.

Partial European Search Report issued in European Application No. 14832999.8, mailed on May 15, 2017, 12 pages.

Strus, et al., "Precise Point Positioning Method for a Static Survey in a High Multipath Environment," ION GNSS 17th international Technical Meeting of the Satellite Division, 2004, pp. 1-9.

Van Dierendonck A J and Arbesser-Rastburg B., "Measuring Ionospheric Scintillation in the Equatorial Region Over Africa, Including Measurements From SBAS Geostationary Satellite Signals," GPS Silicon Valley and European Space Agency/European Space Research and Technology Centre, 2001. 8 pages.

Xu R., et al., "An Analysis of Low-Latitude Ionospheric Scintillation and Its Effects on Precise Point Positioning", Journal of Global Positioning Systems, 2012, vol. 11 (1), pp. 22-32.

\* cited by examiner

REAL-TIME AUTONOMOUS WEATHER AND SPACE WEATHER MONITORING

CROSS REFERENCE TO RELATED APPLICATIONS

This application is a continuation of U.S. patent application Ser. No. 14/909,132 filed on Jan. 31, 2016, which is a is a National Stage Application under 35 U.S.C. 371 of PCT No. PCT/US14/49472, filed Aug. 1, 2014, which claims the benefit of U.S. Provisional Application No. 61/861,948, filed Aug. 2, 2013, and claims the benefit of U.S. Provisional Application No. 61/901,426, filed Nov. 7, 2013, the contents of each of the foregoing applications are fully incorporated by reference herein.

STATEMENT REGARDING FEDERALLY SPONSORED RESEARCH OR DEVELOPMENT

This invention was made with government support under contract FA9453-13-C-0035 awarded by the United States Air Force. The Government has certain rights in the invention.

BACKGROUND

Field of the Invention

This invention relates generally to autonomous weather monitoring and specifically to apparatus, systems, and/or methods for ionospheric monitoring, modeling, and estimation of the same.

Discussion of the Background

Ionospheric variability can have a significant impact on operational capabilities in many areas, including communications, navigation, and surveillance operations. As such, ionospheric monitoring is important for the support of requirements for global space weather impacts specification and forecasting.

A significant source of data for specification and forecasting of ionospheric effects are Global Positioning System (GPS) ionospheric total electronic content (TEC) and ionospheric scintillation. Traditionally, ground-based ionospheric monitoring systems (e.g., ground-based dual frequency GPS instruments) are used for such measurements.

However, one deficiency with the related art is that the availability of such ground-based ionospheric monitoring systems is extremely limited in certain environments (e.g., oceanic regions, theaters/tactical environments and/or other locations). The lack of data from oceanic regions and theater locations adversely impacts the ability for accurate regional and global ionospheric specification and scintillation forecasting. Traditional ground-based ionospheric monitoring systems have not permitted coverage of large ocean areas or on-demand theater coverage.

SUMMARY OF THE INVENTION

Therefore, there is a need for ionospheric monitors, systems, and methods that address the above deficiencies and other problems in the related art.

One advantage of the present invention is to provide a system, e.g., a lightweight, low-power, and fully-autonomous ionospheric monitoring system that is able to provide fully processed and highly accurate ionospheric TEC and scintillation parameters in near real-time over a low data-rate satellite link.

Another advantage of the present invention is to provide error estimates for the ionospheric TEC and scintillation parameters and receive health and/or status information.

Yet another advantage of the present invention is to provide remote unattended operation over areas such as oceans (e.g., using buoys, boats, or other crafts), unfriendly/underdeveloped land masses in which low power and satellite communications are essential, or warfighting theaters where the GPS ionospheric monitors might be disposable.

The present disclosure can provide a number of advantages depending on the particular aspect, embodiment, and/or configuration. These and other advantages will be apparent from the disclosure. Additional features and advantages may be learned by the practice of the invention.

To achieve these and other advantages, as embodied and broadly described, a method of calculating ionospheric scintillation includes measuring one or more radio signals received by an antenna of a monitoring device. Each radio signal from a corresponding orbital navigation satellite is located beyond an ionosphere to the monitoring device located near the Earth's surface. The method further includes calculating a perturbation of the radio signal that is corrected of motion of the monitoring device. The calculating the perturbation includes calculating a navigation solution from a high rate phase data of the radio signal in a window of time, calculating a change of a distance between the monitoring device and the orbital navigation satellite using the navigation solution for each time in the window of time, and calculating a phase of the perturbation using the high rate phase measurement adjusted by the change of distance. The calculating the navigation solution includes interpolating the high rate phase data of the radio signal in the window of time, calculating an offset of the high rate phase data and adding the offset to the high rate phase data as corrected high rate phase data, and calculating a high rate position of the monitoring device using the corrected high rate phase data. The calculating the change of the distance includes calculating the distance between the monitoring device and the orbital navigation satellite for each of the orbital navigation satellites corresponding to each radio signal using the high rate navigation solution and converting the distance to the change of the distance by adjusting the distance with a reference distance. The calculating the phase of the perturbation includes converting the change of the distance to units of cycles with reference to a wavelength of the radio signal, adjusting the high rate phase data with the converted change of the distance as adjusted high rate phase data, and calculating the phase of the perturbation using the adjusted high rate phase data. The method further includes filtering the adjusted high rate phase data with a high pass filter to remove a drift motion of the monitoring device.

In another aspect, the calculating the perturbation includes calculating a tilt angle of the antenna relative to the orbital navigation satellite and calculating an amplitude of the perturbation based on an adjustment of a gain of the antenna at the tilt angle. The calculating the tilt angle is based on a pitch motion, a yaw motion, and a roll motion of the monitoring device and a position of the orbital navigation satellite. The readings of the pitch motion, the yaw motion, and the roll motion are provided by an inertial measurement unit (IMU). The calculating the tilt angle includes calculating, at a plurality of time, corresponding positions of the monitoring device, correlating the positions of the monitoring device with positions derived from a high rate phase navigation solution of the monitoring device, and calculating the positions of the orbital navigation satellite corresponding to the high rate phase navigation solution correlated to the positions of the monitoring device.

In another aspect, the monitoring device is deployed in an oceanic environment. The method further includes calculating a wave height of the oceanic environment, including calculating a high rate position of the monitoring device in a window of time and detrending a height of the antenna to remove a low frequency motion of the monitoring device.

In yet another aspect, an apparatus for calculating ionospheric scintillation includes an antenna configured to receive one or more radio signal, each radio signal from a corresponding orbital navigation satellite located beyond an ionosphere, a monitoring device, including a radio frequency front end (RFE) coupled to the antenna, a digital signal processor (DSP) coupled to the RFE, and a computer coupled to the DSP configured for calculating a perturbation of the radio signal that is corrected of motion of the monitoring device. The calculating the perturbation includes interpolating the high rate phase data of the radio signal in the window of time, calculating an offset of the high rate phase data and adding the offset to the high rate phase data as corrected high rate phase data, calculating a high rate position of the monitoring device using the corrected high rate phase data, calculating the distance between the monitoring device and the orbital navigation satellite for each of the orbital navigation satellites corresponding to each radio signal using a high rate navigation solution, converting the change of the distance to units of cycles with reference to a wavelength of the radio signal, adjusting the high rate phase data with the converted change of the distance as adjusted high rate phase data, and calculating the phase of the perturbation using the adjusted high rate phase data. The apparatus further includes filtering the adjusted high rate phase data with a high pass filter to remove a drift motion of the monitoring device.

In yet another aspect, the apparatus further includes a support module. The support module includes a communication modem configured for communication with a network coupled to the monitoring device, a power management module coupled with and configured for supplying power to the communication modem and the monitoring device, and a battery coupled to the power management module. The apparatus further includes a power source coupled to the power management module. The power source comprises one or more of a solar cell, a wind turbine, and a wave generator.

In still yet another aspect, a monitoring device for calculating ionospheric scintillation includes a radio frequency front end (RFE) coupled to the antenna, a digital signal processor (DSP) coupled to the RFE, and a computer coupled to the DSP configured for calculating a perturbation of the radio signal that is corrected of motion of the monitoring device.

In still another aspect, a method of calculating ionospheric scintillation, includes receiving ionospheric scintillation data from a plurality of monitoring devices through a network. The monitoring devices are located at a plurality of locations near the Earth's surface. The method further includes aggregating the ionospheric scintillation data from the plurality of monitoring devices. The monitoring device is configured for receiving one or more radio signals, each radio signal from a corresponding orbital navigation satellite located beyond an ionosphere. The method further includes calculating a perturbation of the radio signal that is corrected of motion of the monitoring device. The monitoring devices is further configured for the calculating the perturbation of the radio signal that is corrected of motion of the monitoring device. The method further includes calculating an ionosphere weather model using the aggregated ionospheric scintillation data and calculating a high frequency (HF) propagation model using the ionosphere weather model. The method further includes calculating a transmission frequency using the HF propagation model for a location of a network device. The method further includes storing the aggregated ionospheric scintillation data as historical data. A network device has access to one or more of the aggregated ionospheric scintillation data or calculations using the aggregated ionospheric scintillation data based on a subscription.

In still another aspect, a server includes an interface configured for receiving ionospheric scintillation data from a plurality of monitoring devices through a network. The monitoring devices are located at a plurality of locations near the Earth's surface. The service further includes a processor configured for aggregating the ionospheric scintillation data from the plurality of monitoring devices. The monitoring device is configured for receiving one or more radio signals, each radio signal from a corresponding orbital navigation satellite located beyond an ionosphere. The processor is further configured for calculating a perturbation of the radio signal that is corrected of motion of the monitoring device. The processor is further configured for calculating an ionosphere weather model using the aggregated ionospheric scintillation data and calculating a high frequency (HF) propagation model using the ionosphere weather model. The processor is further configured for calculating a transmission frequency using the HF propagation model for a location of a network device. The server further includes a storage configured for storing the aggregated ionospheric scintillation data as historical data. The server further includes a storage configured for storing the aggregated ionospheric scintillation data as historical data.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "module," as used herein, refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein, are used interchangeably and include any type of methodology, process, mathematical operation or technique.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible, utilizing, alone or in combination, one or more of the features set forth above or described in detail below.

DETAILED DESCRIPTION

Figure 1:
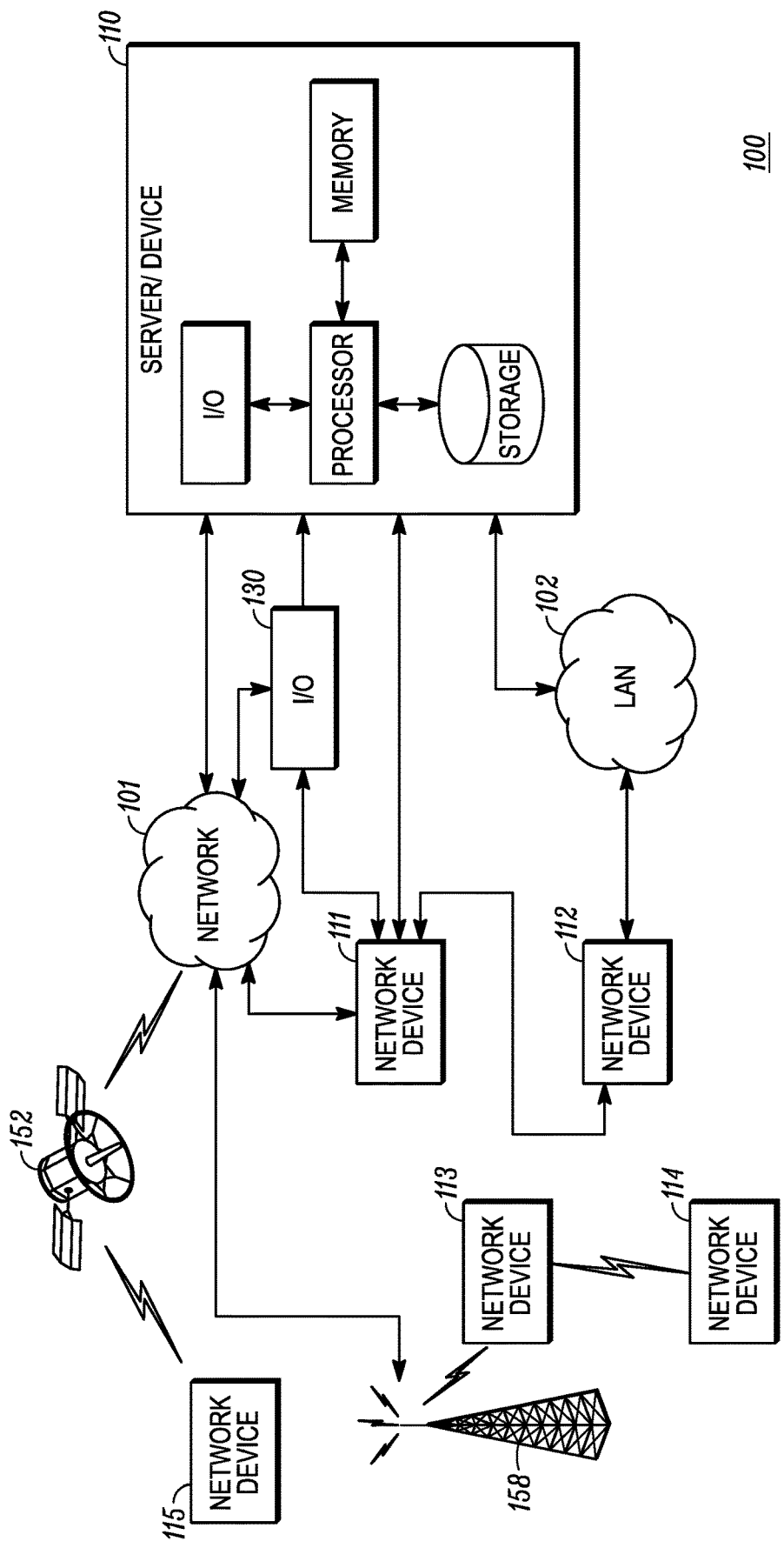
FIG. 1 illustrates an exemplary block diagram of a communication network for a tracking system according to an embodiment.

Embodiments herein presented are not exhaustive, and further embodiments may be now known or later derived by one skilled in the art.

Functional units described in this specification and figures may be labeled as modules, or outputs in order to more particularly emphasize their structural features. A module and/or output may be implemented as hardware, e.g., comprising circuits, gate arrays, off-the-shelf semiconductors such as logic chips, transistors, or other discrete components. They may be fabricated with Very-large-scale integration (VLSI) techniques. A module and/or output may also be implemented in programmable hardware such as field programmable gate arrays, programmable array logic, programmable logic devices or the like. Modules may also be implemented in software for execution by various types of processors. In addition, the modules may be implemented as a combination of hardware and software in one embodiment.

An identified module of programmable or executable code may, for instance, include one or more physical or logical blocks of computer instructions that may, for instance, be organized as an object, procedure, or function. Components of a module need not necessarily be physically located together but may include disparate instructions stored in different locations which, when joined logically together, include the module and achieve the stated function for the module. The different locations may be performed on a network, device, server, and combinations of one or more of the same. A module and/or a program of executable code may be a single instruction, or many instructions, and may even be distributed over several different code segments, among different programs, and across several memory devices. Similarly, data or input for the execution of such modules may be identified and illustrated herein as being an encoding of the modules, or being within modules, and may be embodied in any suitable form and organized within any suitable type of data structure.

In one embodiment, the system, components and/or modules discussed herein may include one or more of the following: a server or other computing system including a processor for processing digital data, memory coupled to the processor for storing digital data, an input digitizer coupled to the processor for inputting digital data, an application program stored in one or more machine data memories and accessible by the processor for directing processing of digital data by the processor, a display device coupled to the processor and memory for displaying information derived from digital data processed by the processor, and a plurality of databases or data management systems.

In one embodiment, functional block components, screen shots, user interaction descriptions, optional selections, various processing steps, and the like are implemented with the system. It should be appreciated that such descriptions may be realized by any number of hardware and/or software components configured to perform the functions described. Accordingly, to implement such descriptions, various integrated circuit components, e.g., memory elements, processing elements, logic elements, look-up tables, input-output devices, displays and the like may be used, which may carry out a variety of functions under the control of one or more microprocessors or other control devices.

In one embodiment, software elements may be implemented with any programming, scripting language, and/or software development environment, e.g., Fortran, C, C++, C#, COBOL, Apache Tomcat, Spring Roo, Web Logic, Web Sphere, assembler, PERL, Visual Basic, SQL, SQL Stored Procedures, AJAX, extensible markup language (XML), Flex, Flash, Java, .Net and the like. Moreover, the various functionality in the embodiments may be implemented with any combination of data structures, objects, processes, routines or other programming elements.

In one embodiment, any number of conventional techniques for data transmission, signaling, data processing, network control, and the like as one skilled in the art will understand may be used. Further, detection or prevention of security issues using various techniques known in the art, e.g., encryption, may be also be used in embodiments of the invention. Additionally, many of the functional units and/or modules, e.g., shown in the figures, may be described as being "in communication" with other functional units and/or modules. Being "in communication" refers to any manner and/or way in which functional units and/or modules, such as, but not limited to, input/output devices, computers, laptop computers, PDAs, mobile devices, smart phones, modules, and other types of hardware and/or software may be in communication with each other. Some non-limiting examples include communicating, sending and/or receiving data via a network, a wireless network, software, instructions, circuitry, phone lines, Internet lines, fiber optic lines, satellite signals, electric signals, electrical and magnetic fields and/or pulses, and/or the like and combinations of the same.

By way of example, communication among the users, subscribers and/or server in accordance with embodiments of the invention may be accomplished through any suitable communication channels, such as, for example, a telephone network, an extranet, an intranet, the Internet, cloud based communication, point of interaction devices (point of sale device, personal digital assistant, cellular phone, kiosk, and the like), online communications, off-line communications, wireless communications, RF communications, cellular communications, Wi-Fi communications, transponder communications, local area network (LAN) communications, wide area network (WAN) communications, networked or linked devices and/or the like. Moreover, although embodiments of the invention may be implemented with TCP/IP communications protocols, other techniques of communication may also be implemented using IEEE protocols, IPX, Appletalk, IP-6, NetBIOS, OSI or any number of existing or future protocols. Specific information related to the protocols, standards, and application software utilized in connection with the Internet is generally known to those skilled in the art and, as such, need not be detailed herein.

In embodiments of the invention, the system provides and/or receives a communication or notification via the communication system to or from an end user. The communication is typically sent over a network, e.g., a communication network. The network may utilize one or more of a plurality of wireless communication standards, protocols or wireless interfaces (including LTE, CDMA, WCDMA, TDMA, UMTS, GSM, GPRS, OFDMA, WiMAX, FLO TV, Mobile DTV, WLAN, and Bluetooth technologies), and may be provided across multiple wireless network service providers. The system may be used with any mobile communication device service (e.g., texting, voice calls, games, videos, Internet access, online books, etc.), SMS, MMS, email, mobile, land phone, tablet, smartphone, television, vibrotactile glove, voice carry over, video phone, pager, relay service, teletypewriter, and/or GPS and combinations of the same.

The ionosphere is a region of the Earth's upper atmosphere, ranging from about 100 km to 800 km in altitude. The ionosphere is distinguished by ionization of the atmospheric gases by solar and cosmic radiation. The ionosphere is useful for high frequency (HF) radio waves (e.g., short-wave radio at 1.6-30 MHz) communication because the HF radio waves may be refracted by the ionosphere, thereby extending the range of the communication by the HF radio waves bouncing between the ionosphere and the Earth's surface. For example, a transcontinental HF transmission may use several bounces between the ionosphere and the Earth's surface.

Irregularities in the ionosphere affect the transmission of radio waves as ionospheric scintillation. The effects include diffraction and scattering of the radio signals and others as known in the art. For HF radio waves refracted by the ionosphere, the practical effect may be that the refracted radio waves may be bounced to a different location from the intended receiver location. For trans-ionospheric radio signals (e.g., signals from GPS satellites, which may be at about 20,000 km orbits and have a frequency of over 1 GHz), the practical effect may be signal power fading, phase cycle slips, receiver loss of lock, and degradation in the overall quality of the received signal.

Ionospheric scintillation may be defined and measured as perturbation in the phase and amplitude of the signals. The $\sigma\Phi$ may be measured as the root mean squared perturbation of the phase. The $S_4$ may be measured as the root mean squared perturbation of the amplitude.

The ionospheric scintillation of a location in the ionosphere varies over time depending on a number of factors that affects the ionospheric weather (e.g., solar activity). The $\sigma\Phi$ and $S_4$ may be measured on the Earth's surface through measurement of data from GPS satellites (or other data). In an embodiment, a model of the ionospheric weather and scintillation of the ionosphere may be developed with enough readings of various parts of the ionosphere using Earth-based monitoring systems located at various points on the Earth's surface. In turn, this ionospheric model may be used to develop an HF radio waves propagation model for communication.

FIG. 1 illustrates an exemplary block diagram of a communication network for a tracking system according to an embodiment.

Referring to FIG. 1, communication network 100 includes one or more networks, including wide-area network 101, e.g., the Internet, company or organization Intranet, and/or sections of the Internet (e.g., virtual private networks, Clouds, and the Dark Web), and local-area network 102, e.g., interconnected computers localized at a geographical and/or organization location and ad-hoc networks connected using various wired means, e.g., Ethernet, coaxial, fiber optic, and other wired connections, and wireless means, e.g., Wi-Fi, Bluetooth, and other wireless connections. Communication network 100 includes a number of network devices 110-115 that are in communication with the other devices through the various networks 101 and 102 and through other means, e.g., direct connection through an input/output port of a network device 130, direct connection through a wired or wireless means, and indirect connection through an input-output box, e.g., a switch.

Network devices 110-115, which may also connect through the networks 101 and 102 using various routers, access points, and other means. For example, network device 113 wirelessly connects to a base station 158, which acts as an access point to the wide area network 101. Base station 158 may be a cellular phone tower, a Wi-Fi router or access point, or other devices that allow a network device, e.g., wireless network device 113, to connect to a network, e.g., wide area network 101, through the base station 158. Base station 158 may be connected directly to network 101 through a wired or wireless connection or may be routed through additional intermediate service providers or exchanges. Wireless device 113 connecting through base station 158 may also act as a mobile access point in an ad-hoc or other wireless network, providing access for network device 115 through network device 113 and base station 158 to network 101.

In some scenarios, there may be multiple base stations, each connected to the network 101, within the range of network device 113. In addition, a network device, e.g., network device 113, may be travelling and moving in and out of the range of each of the multiple base stations. In such case, the base stations may perform handoff procedures with the network device and other base stations to ensure minimal interruption to the network device's connection to network 101 when the network device is moved out of the range of the handling base station. In performing the handoff procedure, the network device and/or the multiple base stations may continuously measure the signal strength of the network device with respect to each base station and handing off the network device to another base station with a high signal strength to the network device when the signal strength of the handling base station is below a certain threshold.

In another example, a network device, e.g., network device 115, may wirelessly connect with an orbital satellite 152, e.g., when the network device is outside of the range of terrestrial base stations. The orbital satellite 152 may be wirelessly connected to a terrestrial base station that provides access to network 101 as known in the art.

In other cases, orbital satellite 152 or other satellites may provide other functions such as global positioning and providing the network device with location information or estimations of location information of the network device directly without needing to pass information to the network 101. The location information or estimation of location information is known in the art. The network device may also use geolocation methods, e.g., measuring and analyzing signal strength, using the multiple base stations to determine location without needing to pass information to the network 101. In an embodiment, the global positioning functionality of the orbital satellite 152 may use a separate interface than the communication functionality of the orbital satellite 152 (e.g., the global position functionality uses a separate interface, hardware, software, or other components of the network device 113 than the communication functionality). In another embodiment, the orbital satellite with the global position functionality is a physically separate satellite from the orbital satellite with communication functionality.

In one scenario, network device, e.g., network device 112, may connect to wide area network 101 through the local area network 102 and another network device, e.g., network device 110. Here, the network device 110 may be a server, router, gateway, or other devices that provide access to wide area network 101 for devices connected with local area network 102.

Figure 2:
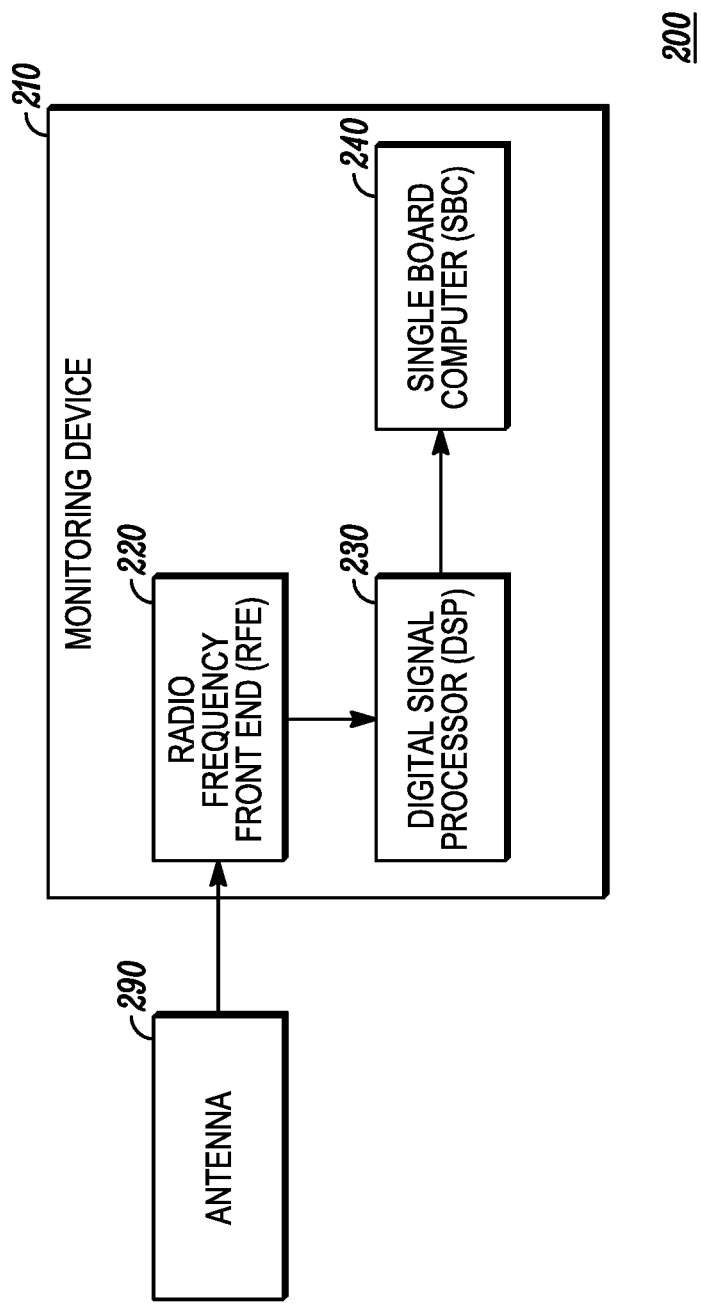
FIG. 2 illustrates an exemplary block diagram of a monitoring device according to an embodiment.

FIG. 2 illustrates an exemplary block diagram of a monitoring device according to an embodiment.

Referring to FIG. 2, the monitoring device is generally depicted as reference 200. The monitoring device may be characterized as a global navigation satellite system (GNSS) receiver for space weather monitoring. In one embodiment, the signal is a GNSS signal. Optionally, the GNSS receiver may be used as a GPS receiver. In one embodiment, the signal is a GNSS signal. Optionally, the GNSS receiver may be used as a GPS receiver. The monitoring device 200 includes a radio frequency front end (RFE) 220, digital signal processor (DSP) 230, and computer 240 (e.g., single board computer (SBC)). In an embodiment, the RFE 220 is configured to receive signals from an antenna 290 (e.g., GPS antenna), where the antenna is configured to receive signals from a corresponding satellite (e.g., GPS satellite). For example, the RFE 220 may include an intermediate frequency (IF) processor for managing and extracting the data (e.g., GPS IF samples) from the antenna. The RFE 220 is in electrical communication with the DSP 230, which may read the IF samples from the RFE and track observables (e.g., pseudoranges such as the distance between the GPS satellite and the antenna 290, carrier phases, and Doppler measurements). The computer 240 is coupled to the DSP 230, which may read the observables from the DSP 230, perform the adjustment calculations (e.g., scintillation calculations), and store and/or send the data to the user.

In a preferred embodiment, the monitoring device 200 is implemented with the various modules (e.g., RFE 220, DSP 230, and computer 240) on one or more interface boards for reducing processing power needs, e.g., with specialized hardware and instruction sets. In one embodiment, the monitoring device 200 may include three boards stacked vertically (with exemplary size of 4"×3.75"×1.25" and weight of 200 g), a board for each of the RFE 220, DSP 230, and computer 240. In an alternate embodiment, the monitoring device 200 may be implemented as a single device (e.g., the RFE 220, the DSP 230, the computer 240, and also optionally the antenna 290 may be implemented as a single device, such as using a general purpose computer or a virtual machine using one instruction set). In another alternate embodiment, the monitoring device 200 may be implemented over multiple devices (e.g., multi-core devices or virtual devices). In an embodiment, the monitoring device 200 or the various components may be implemented through available components and devices as known now or later derived in the art.

In an embodiment, the monitoring device 200 is configured to perform one or more of the following obtain precise GPS total electron content and scintillation, track through severe scintillations, reliable operation in weak-signal environments, flexible communication interfaces, remote programming/reconfigurability, low unit cost makes it feasible to deploy an array of receivers for more complete data acquisition, available with or without WiFi capability, onboard computer reduces infrastructure costs and complexity and includes optionally many data recording solutions on board or off-board, e.g., storage devices, network attached storage device, e.g., cloud storage, combinations of the same and the like.

In an embodiment, the monitoring device 200 may be designed for reduced power consumption configured for continuous or prolonged operations through power generated in-situ with suitable modules, e.g., solar panel power supply, wind power supply, wave power supply, combinations of the same and the like, thereby allowing a unit to be positioned a at a remote location without maintenance or user intervention.

For example, the RFE 220 may include low power MMIC amplifiers and power supply regulators. The RFE 220 may also include a current monitor to the antenna port (for detecting the current from the antenna 210) and an RF level monitor to the L1/L2 AGCs of the GPS RFE for health monitor. Such health monitor modules may be part of the data sent to the user via the network 100 as discussed with respect to FIG. 1 and will be further discussed below. In one implementation, the RFE 220 may be designed to operation with a current of at least 275 mA and a voltage of at least 3.6 V.

In another embodiment, the monitoring device 200 may optionally/alternatively include a location module configured for geo-location of the monitoring device 200. The geo-location module may include geo-location sensors as known in the art configured to perform geo-location techniques for location of the module.

In another example, the computer 240 may be a single board computer. The single board computer is designed with a physical layout to match the profiles of RFE 220 and the DSP 230 and may be manufactured using PCB manufacturing.

In embodiment, the DSP clock speed of the DSP 230 may be reduced to at least 720 MHz or lower in order to reduce the power consumption of DSP 230. In empirical testing, a DSP clock speed of 720 MHz reduces DSP board power consumption by about eleven and half percent (11.5%) over a DSP clock speed of 1.02 GHz while increasing CPU (e.g., computer 240) utilization by about thirty five percent (35%). The DSP 230 may also use a modified acquisition strategy such as eliminating unnecessary computations that acquires even non-existent signals. For example, an acquisition loop process of the DSP 230 may cycle through all of the available pseudorandom noise codes (PRNs) in the constellation at a rate of one per second. After the initial navigation solution, the GPS almanac data is used to calculate each PRNs azimuth and elevation. As such, this process acquires non-existent signals at the expense of wasted power. In an embodiment, the DSP 230 may acquire only the PRNs that should be visible while ignoring the non-visible PRNs.

In an embodiment, the DSP 230 may use DSP protocols as known in the art or may be later derived in the art. In a preferred embodiment, the DSP 230 may use the multi-channel buffered serial port (McBSP) protocol available on Gumstix devices (e.g., Gumstix SBC) to facilitate bi-directional communication between the DSP 230 and the computer 240. In a further embodiment, a serial protocol (e.g. McBSP) may support at least 500 kbit/s bandwidth for data transmission between the DSP 230 and the SBC 240.

In a preferred embodiment, the monitoring device 200 receives and processes parameters including high rate data (per channel) at a configurable rate of about 50-100 Hz, such as integrated carrier phase, in-phase accumulation, quadrature accumulation, GPS time, and receiver time, low rate data (per channel) at a configurable rate of 1 Hz or greater, such as pseudorange-based TEC, phase-based delta TEC, pseudorange, integrated carrier phase, GPS time, receiver time, Doppler frequency, SV elevation, SV azimuth, C/NO, data validity flag, cycle slip flag, signal acquisition status, PRN, and SV health, scintillation parameters (per channel at a configurable rate of about 0.01 Hz, such as $S_4$, $\sigma\Phi$, $\tau_o$, scintillation power ratio, GPS time, reference channel status, PRN, and other parameters at a configurable rate of 1 Hz or greater, such as receiver X/Y/Z position, receiver X/Y/Z GPS time, receiver time, velocity, receiver clock error, receiver clock error rate, and navigation solution flag.

The monitoring device may include fixed or adjustable parameters. The adjustable parameters may be configured through software changes, which is an advantage over the related art. In an embodiment, the parameters include one or more of a number of tracking channels, low rate data cadence, Scintillation parameters, high rate data availability & cadence, data storage options, EML chip spacing, PLL loop order, PLL bandwidth, PLL discriminator type, DLL bandwidth, FLL bandwidth, FLL weak bandwidth, Code generation type, navigation smoothing parameters, SPR threshold for non-scintillating channel, window length for scintillation, calculations, frequency resolution for SPR calculation, scintillation threshold for triggering, selective availability of high rate data, elevation mask for scintillation triggering. Optionally, the parameters are hardware configured or a combination of hardware and software. In one embodiment, the channel configuration is customizable, e.g., 40 channels to for signal tracking, e.g., L1 and L2C. The data rate is configurable.

Figure 3:
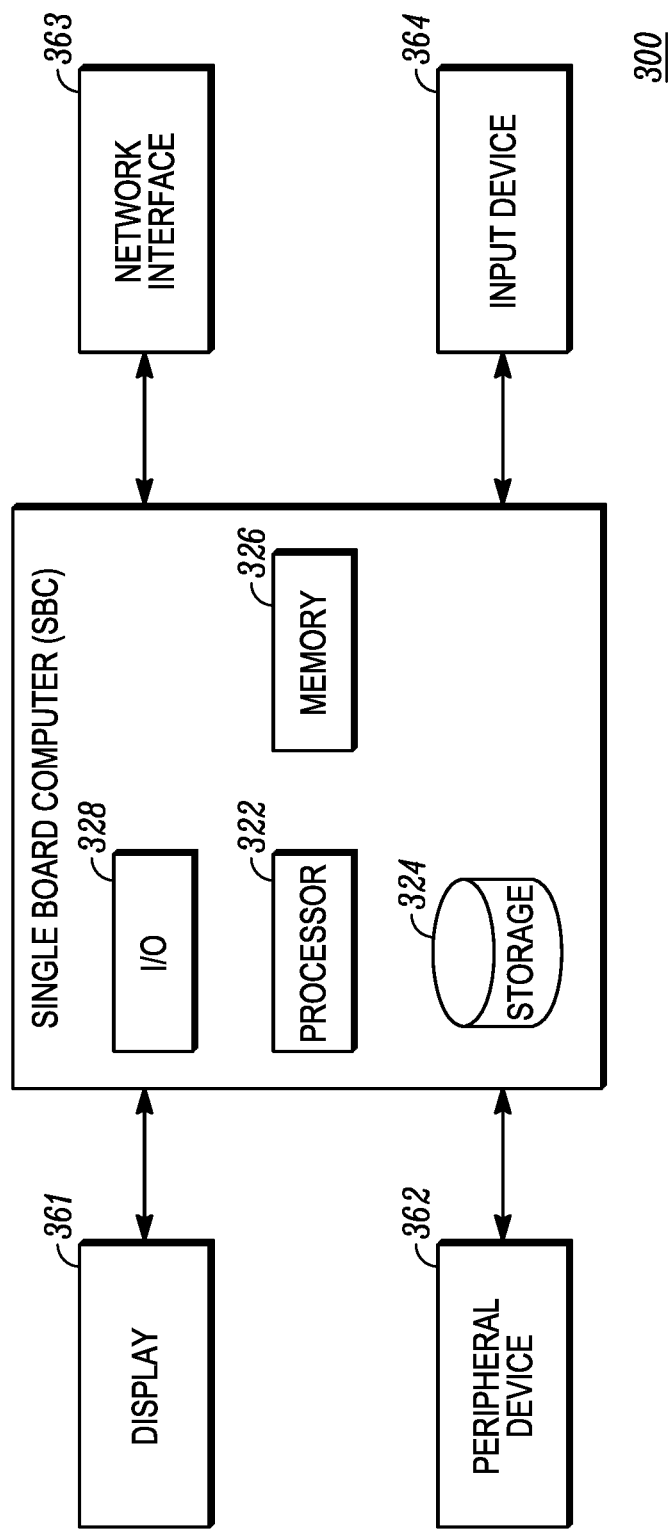
FIG. 3 illustrates an exemplary block diagram of a computer for a monitoring device according to an embodiment.

FIG. 3 illustrates an exemplary block diagram of a computer for a monitoring device according to an embodiment. The computer 300 may be a single board computer 240 as discussed above with respect to FIG. 2. The computer 300 is configured perform at least general purpose calculations (e.g., scintillation calculation) and package, save, and/or send the calculated data to a user.

Referring to FIG. 3, the computer 300 includes one or more processors 322, storages 324, memories 326, and input and output interfaces 328. A computer 300 may or may not contain all of the above components depending on the purpose and use of the device. For example, the computer 300 may be a dummy terminal that only requires an input and output interface to send the input and receive the output from a device that contains a processor for processing the input and outputs.

The computer 300 may be connected with one or more displays 361, peripheral devices 362, network interfaces 363, and input devices 364. Displays 361 may be visible screens, audible speakers, holographic displays, Braille text devices, other devices, and combinations of the same, that are configured to output information to a user. Peripheral devices 362 may include printers, external storages, other devices, and combinations of the same. Network interfaces 363 may include wired and wireless interfaces that connect the computer 300 to a network, other devices, and combinations of the same. Input devices 364 may include keyboards, mice, other input devices to input information to the computer 300, and combinations of the same. The one or more devices may be connected with or integral to the computer 300. For example, a monitoring device 200 may have an integrated display 361 which may pull up an input device 364, e.g., a soft keyboard, in a touch screen of the display 361. Another device may have a separate display monitor 361 connected to a display port, e.g., VGA, DVI, HDMI, other standard, and/or combinations of the same, of the computer 300 and a hardware keyboard connected to the device 310 through an input port, e.g., keyboard port and USB.

Figure 4:
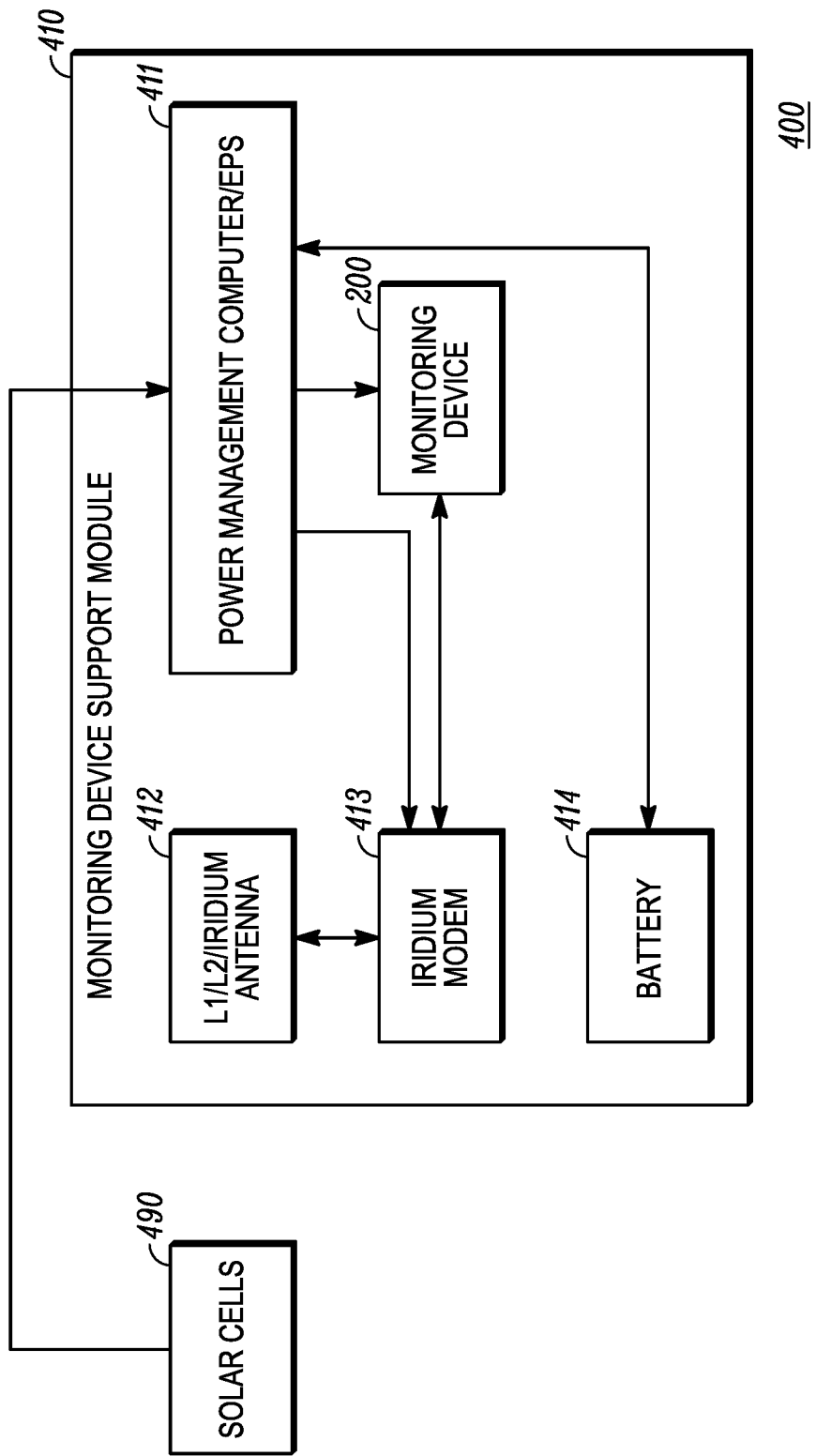
FIG. 4 illustrates an exemplary block diagram of a support module for a monitoring device according to an embodiment.

FIG. 4 illustrates an exemplary block diagram of a support module for a monitoring device according to an embodiment.

In one embodiment, the monitoring device 200 may be used at remote locations such as oceanic locations, e.g., positioned on buoys, oceanic crafts, or other locations (e.g., tactical sites in hostile or underdeveloped environment). For example, such locations may lack power or communication infrastructures. As such, the monitoring device 200 may require a standalone system supplying power and communication, e.g., satellite communication, to the network 100.

In one embodiment, the satellite communication includes, e.g., TDMA and/or DFMA using L-band spectrum as with the Iridium system or others as known in the art.

Support module 400 includes a power management module 411 (e.g., power management computer and/or EPS), monitoring device 200, battery 414, satellite modem or other communication device 413, and corresponding antenna 412 for the satellite modem or other communication device 413. The power management module 411 is coupled to the battery 414 for supplying power to the monitoring device 200 and the communication device 413, which is coupled to the corresponding antenna 412. In an embodiment, the support module 400 may include the power management module 411 optionally, and the battery 414 directly supplies power to the monitoring device 200 and the communication device 413. In another embodiment, the support module 400 includes or is connected to a solar panel or other power generator/source 490 (e.g., wind turbine) for producing power to support module 400 and/or charging battery 414 (through the power management module 411).

The communication device 413 may be a satellite modem (e.g., Iridium modem) configured for communication between the monitoring device 200 with the network 100 (e.g., through satellite 152, such as an Iridium satellite). The communication device 413 connects with the monitoring device 200 through the computer 240 using a serial data link.

In an embodiment, the support module 400 may include a packaging on the outside of the support module 400 for providing weather resistance, thermal management, and other outside element management to the support module 400. The packaging may also be of a suitable size, weight, and other properties for deployment at a target location. For example, the packaging may be configured to contain the support module 400 in a sealed environment inside the packaging. The antenna 412 and the power source 490 (e.g., solar panel) may be secured to the outside of the packaging. In a further embodiment, the packaging may include or be placed on a buoy that floats on water configured for an oceanic environment. The sealed environment may include waterproof, weatherproof, hermetically sealed and combinations of the same configured for the environment and/or location. The environment may also be radiation hardened as known in the art.

In a preferred embodiment, the support module 400 may include four (4) solar panels, each dimensions approximately 505×352×28 mm and weighs 5 lbs (e.g., Everbright 03203). Each solar panel may produce a peak power of 25 W at an OC voltage of 21.8 V and a SC current of 1.59 A. The DC converter or regulator for the solar panels may produce an output of 5 V (e.g., as the operating voltage for the monitoring device 200). The battery may have a voltage of about 12-14.8 V and capacity ranging from 252-312 Wh. The battery may be dimensioned from 5"×3"×2.5" to 7"×6.6"×7".

Figure 5A:
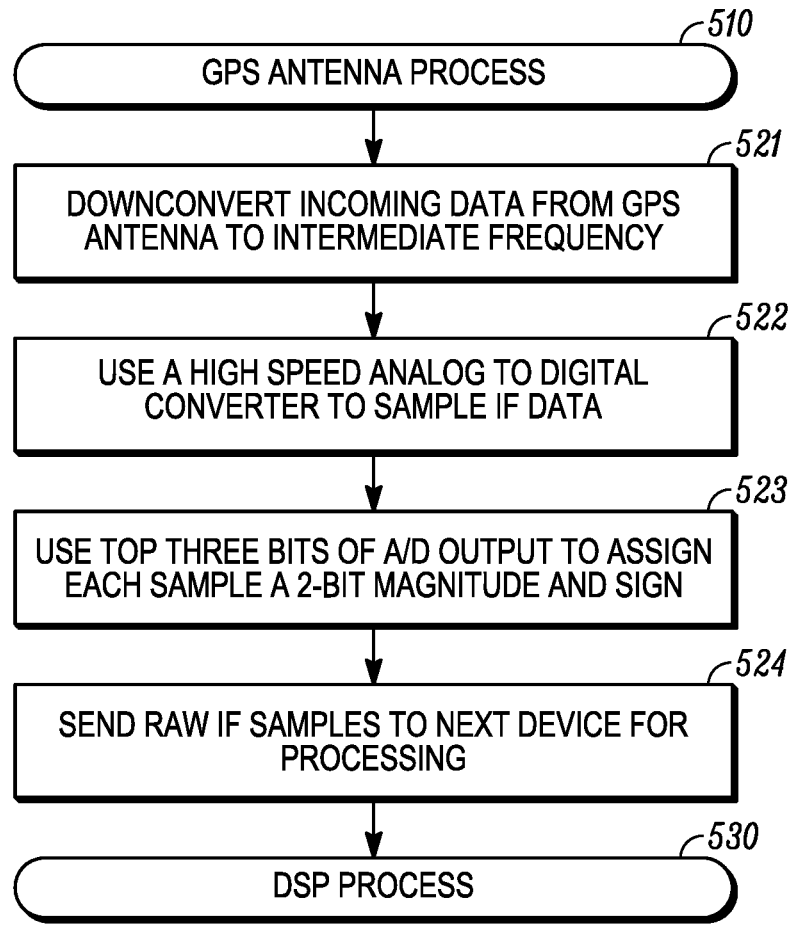
FIGS. 5A-5C illustrate exemplary flow diagrams of a monitoring process for a monitoring device according to an embodiment.
Figure 5B:
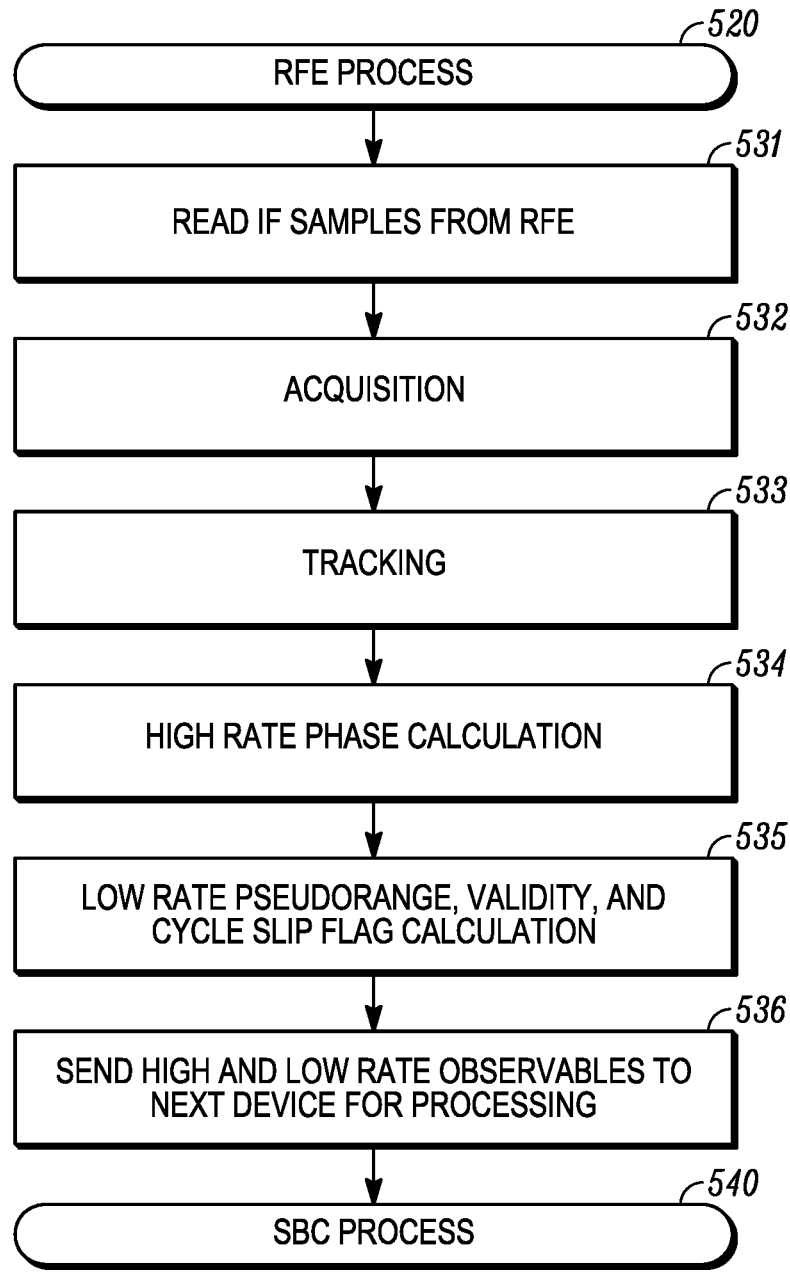
Figure 5C:
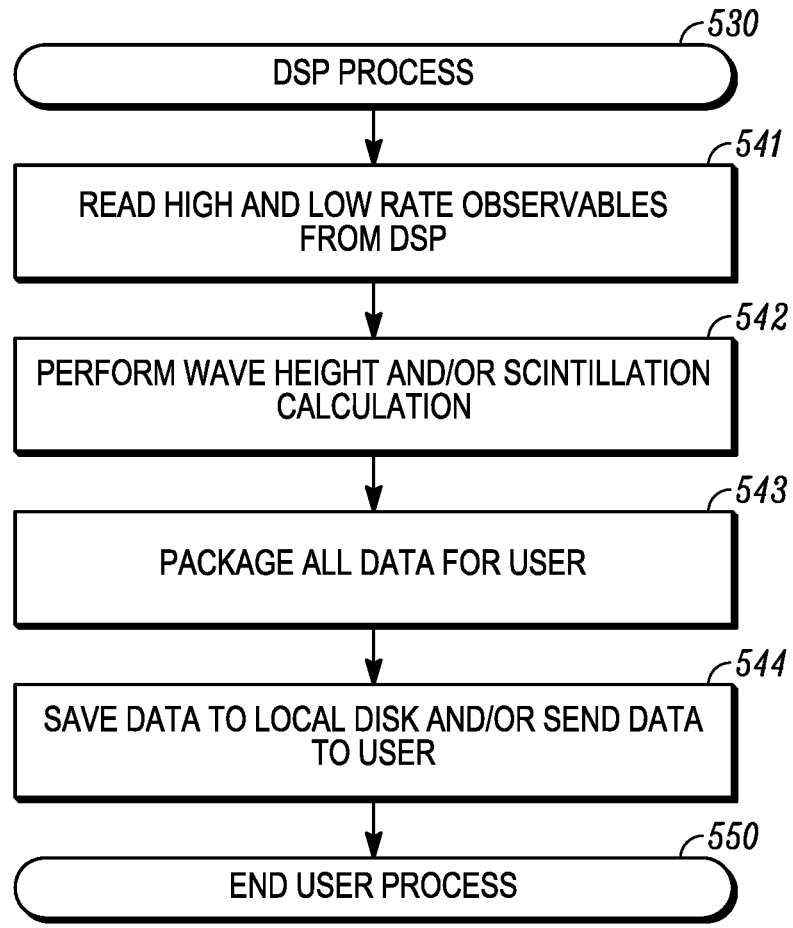

FIGS. 5A-5C illustrate exemplary flow diagrams of a monitoring process for a monitoring device according to an embodiment.

Referring to FIG. 5A, the monitoring process starts with the GPS antenna process 510. For example, the GPS antenna process 510 may include the GPS antenna 290 receiving incoming data from the corresponding GPS satellites.

Next, the RFE 220 conducts the RFE process 520. The RFE process 520 starts with step 521 to downconvert incoming data from the GPS antenna 290 to an intermediate frequency (IF).

Next, the RFE 220 uses a high speed analog to digital converter (A/D) to sample the IF data in step 522. In an embodiment, data from the $L_1$ and $L_2$ band of the GPS frequency is used. The high speed A/D may use about 2 MHz bandwidth per $L_1$ and $L_2$ band for a total of 4 MHz. In an embodiment, a preferred sample rate may be in the range of about 4 to about 40 MHz. This corresponds to the use of a 40 MHz serial clock frequency and a 10 MHz oscillator. In a preferred embodiment, the sample rate is 40 MHz/7 or 5.7 MHz.

Next, in an embodiment, the top three (3) bits of the A/D output are used to assign each sample of the IF data to a 2-bit magnitude and sign in step 523. This step 523 helps reduce the processing bitrate by the DSP. For example, the top bit of the three bit A/D output may be the sign bit. According to an embodiment, a 2-bit magnitude and sign may be assigned for each sample value of the $L_1$ and $L_2$ band. As such, a 4-bit sample may be used, two for each magnitude and sign of the $L_1$ and $L_2$ band respectively. This requires 4-bit×5.7 MHz=22 Mbit/s bit rate for sending to and processing by the DSP 230. In another embodiment, the bit resolution of the output of the A/D may be set according to other criteria.

The raw IF samples are sent to the DSP 230 for processing in step 524.

Referring to FIG. 5B, next, the DSP 230 conducts the DSP process 530. The DSP process 530 starts with step 531 to read the raw IF samples from the RFE 510. In a preferred embodiment, the McBSP protocol may be used for this step 531. In a further embodiment, a serial protocol that supports at least bandwidth of the bit resolution as assigned in step 522 may be used for the data transmission in this step 531.

Next, the raw IF samples are used for the acquisition of the location of the monitoring device 200 in step 532 and the tracking of the monitoring device 200 in step 533. In an embodiment, this acquisition process is fast Fourier transform (FFT) based. In a preferred embodiment, the acquisition process in step 532 and the tracking process in step 533 may be performed as disclosed in U.S. Pat. Nos. 7,010,060 and 7,305,021, both of which are herein incorporated by reference in their entireties.

Next, the high rate phase is calculated in step 534. For example, the high rate phase may be in the range of 25 Hz up to 1 kHz, typically from 50 to 100 Hz. The low rate phase may be derived from the high rate phase and is on the order of about 0 Hz to about 25 Hz, typically at about 1 Hz.

Next, the high and low rate observables, such as the low rate pseudorange, validity, and cycle slip flag are calculated in step 535. It is noted that these parameters consist the GPS observables. In an embodiment, the low rate pseudorange, validity, and cycle slip flag are of particular relevance to the calculation of the $\sigma\Phi$.

The high and low rate observables are sent to the computer 240 for processing in step 536.

Referring to FIG. 5C, next, the computer 240 conducts the SBC process 540. The SBC process 540 starts with step 541 to read the high and low rate observables from the DSP 230.

The computer 240 may perform a scintillation calculation in step 542. In an embodiment, the scintillation calculation may include compensation for monitoring devices that are deployed in an oceanic environment that requires correction due to the effect of the antenna motion. Further details on the scintillation calculation will be discussed below with respect to FIGS. 6-10.

Next, all calculated data is packaged for the user in step 543. The raw packaged data may be in the form of double precision float or other suitable data type depending on the need for maximum precision or with less precision to save memory. In step 543, the calculated data may be packaged according to a desired output data of the user. The packaged data is saved to a local disk (e.g., storage 324) and/or sent to the user through a local port (e.g., peripheral device 362) or through network 100 in step 544.

In an implementation, the monitoring device 200 may be implemented as one or more of a discrete device, software as a service (SAAS) module, an integrated solution device (e.g., a combination of the monitoring device 200 and other related devices for providing an integrated solution), and other devices. In one implementation, the monitoring device 200 as an SAAS may need the data to be packaged to be sent through a wired or wireless means to a centralized server at a point of network 100, and the centralized server may serve the data in packaged or other form as needed to the user (e.g., to the user's mobile device). In another implementation, the SAAS may send the packaged data in a form as needed directly to the user's device through the wired or wireless means at a point of the network 100. The user's device may include a control software able to communicate with and/or code data from the monitoring device 200 using an API or other means as now known or later derived.

In another implementation, the monitoring process for the monitoring device 200 may include a further step of receiving instructions from a user through a wired or wireless means locally or through a network 100 for making adjustments or corrections to the monitoring device 200 such as making corrections to the GPS antenna 290 or other corrections.

In an embodiment, a server or a collection point 110 at a network 101 may be used to receive and collect the data from various monitoring devices 200 located at various locations. The server may aggregate the data from the various monitoring devices 200 and package the data to form an ionospheric weather report. In an embodiment, ionospheric modeling and HF propagation modeling may be performed to obtain the corresponding models to facilitate radio communication. Such ionospheric model and HF propagation model may be served to the various network devices 111-115 as an SAAS (e.g., through an application on the network devices 111-115) or through other means (e.g., downloadable from the server 101, pushed to the network devices 111-115, etc.). In another embodiment, the raw data received and collected by the server 110 may be available to other uses (e.g., the network devices 111-115 obtaining the raw data and performing their own analysis on the data, a third-party obtaining the raw data for record and storage, etc.).

In a further embodiment, historical data on ionospheric weather may be collected and stored. This may be useful in a forensic context. For example, an oceanic vessel, e.g., ship, may have lost contact, but the ship's last known radio signal was known to have been received by a receiver at a certain location at a certain time. The historical data on the ionospheric weather may be used to determine the ship's location at the time when the radio signal was sent by backtracking from the known receiver's location. In another embodiment, the historical data on the ionospheric weather may be supplied to third parties for other analysis.

Figure 6:
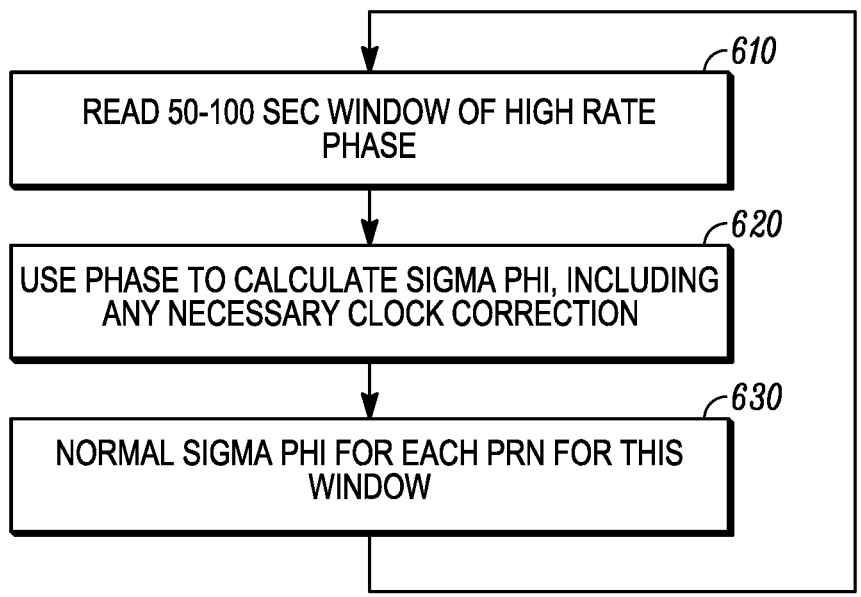
FIG. 6 illustrates an exemplary flow diagram of a $\sigma\Phi$ calculation process for a monitoring device.

FIG. 6 illustrates an exemplary flow diagram of a $\sigma\Phi$ calculation process for a monitoring device.

In an application where the monitoring device 200 is deployed at a static location, the $\sigma\Phi$ for the monitoring device 200 may be calculated using the $\sigma\Phi$ calculation process 600.

Figure 11A:
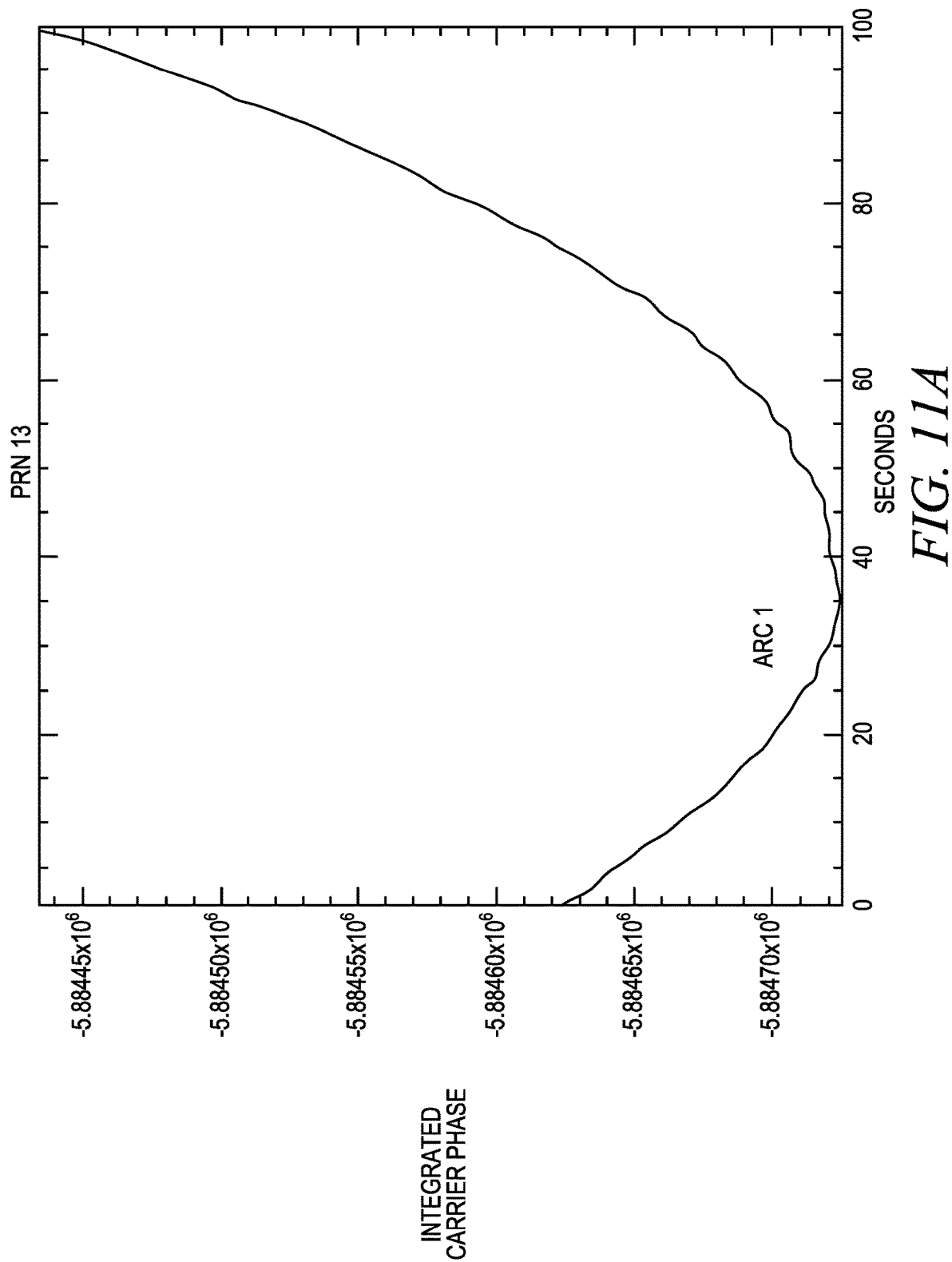
FIGS. 11A-11C illustrate exemplary PRNs according to an example of the invention.
Figure 11B:
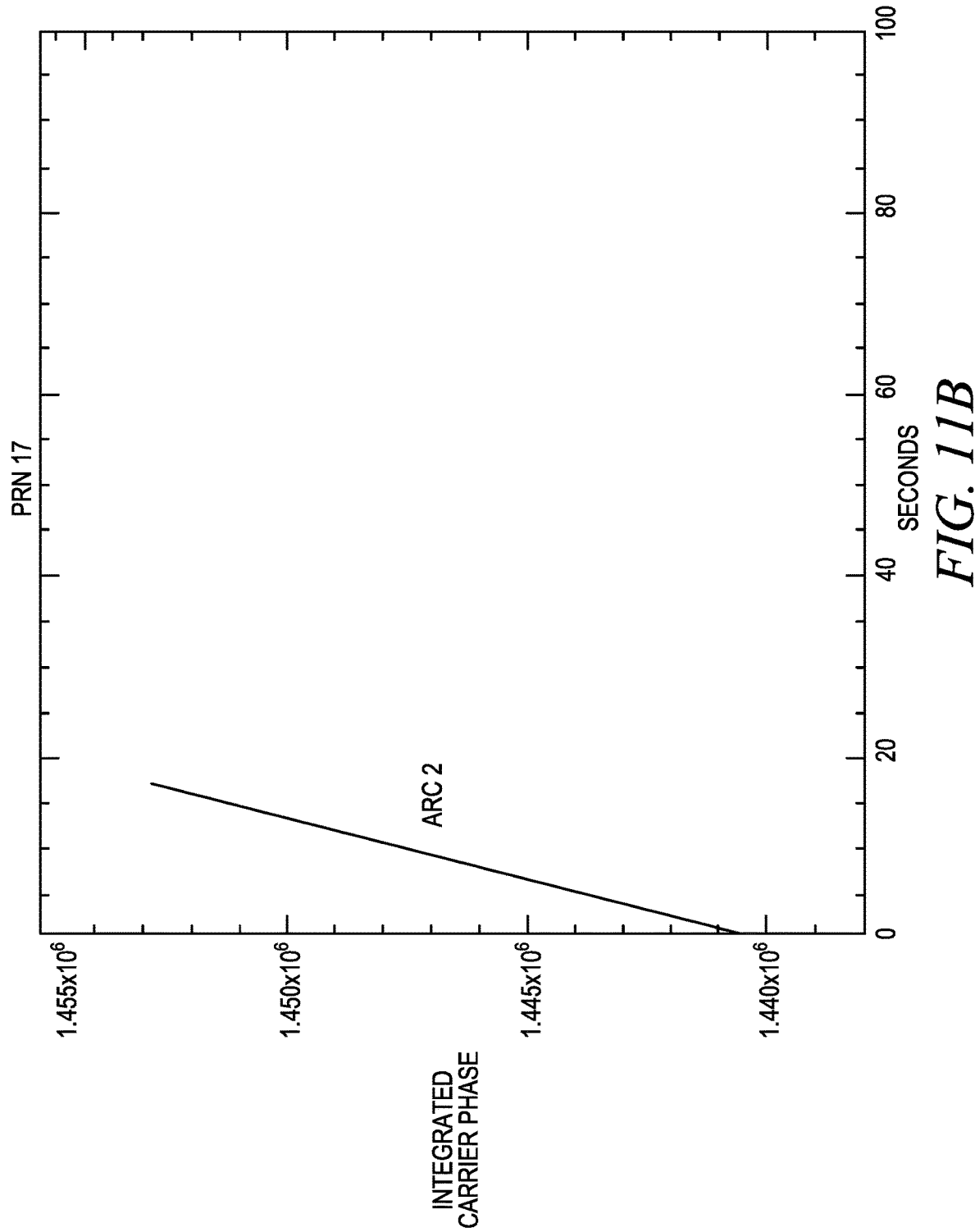
Figure 11C:
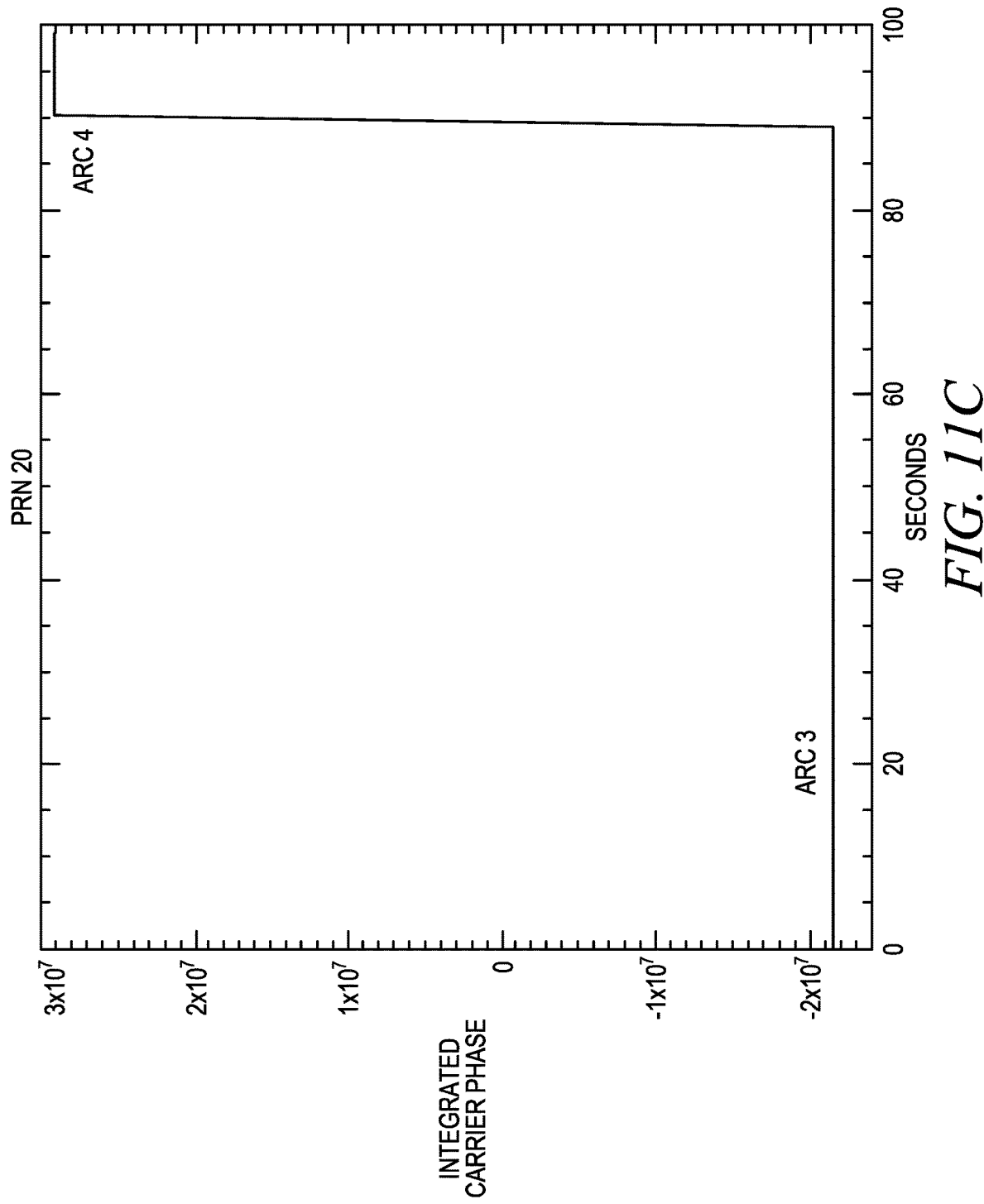

The process 600 starts with step 610 to read 50-100 seconds window of the high rate phase calculated by the DSP 230 (e.g., by step 534). Next, the $\sigma\Phi$ is calculated using the high rate phase in step 620. An exemplary calculation may include taking a high pass of the high rate phase. The $\sigma\Phi$ calculation may also include any necessary clock correction as needed. Next, the $\sigma\Phi$ is normalized for each PRN for this window in step 630. Example PRNs are illustrated in FIGS. 11A-11C.

Figure 7A:
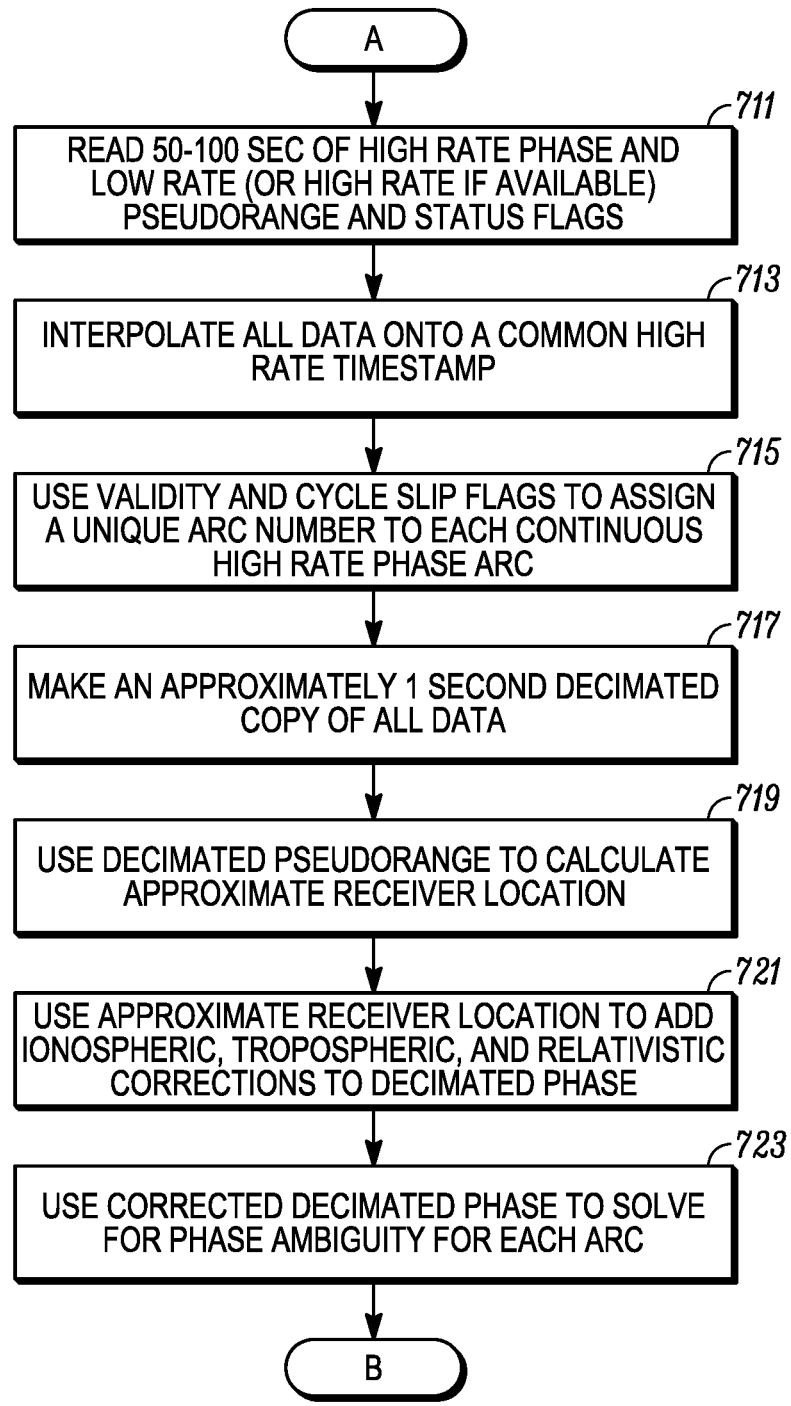
FIGS. 7A-7C illustrate exemplary flow diagrams of a motion-corrected $\sigma\Phi$ calculation process for a monitoring device according to an embodiment.
Figure 7B:
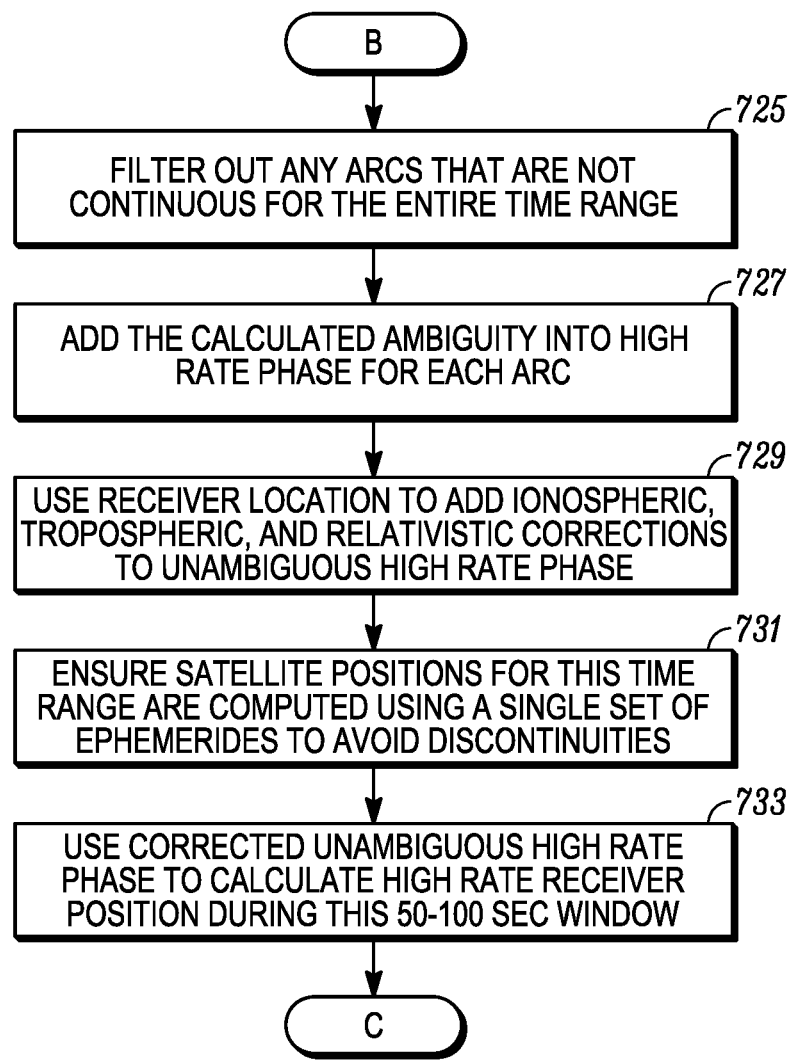
Figure 7C:
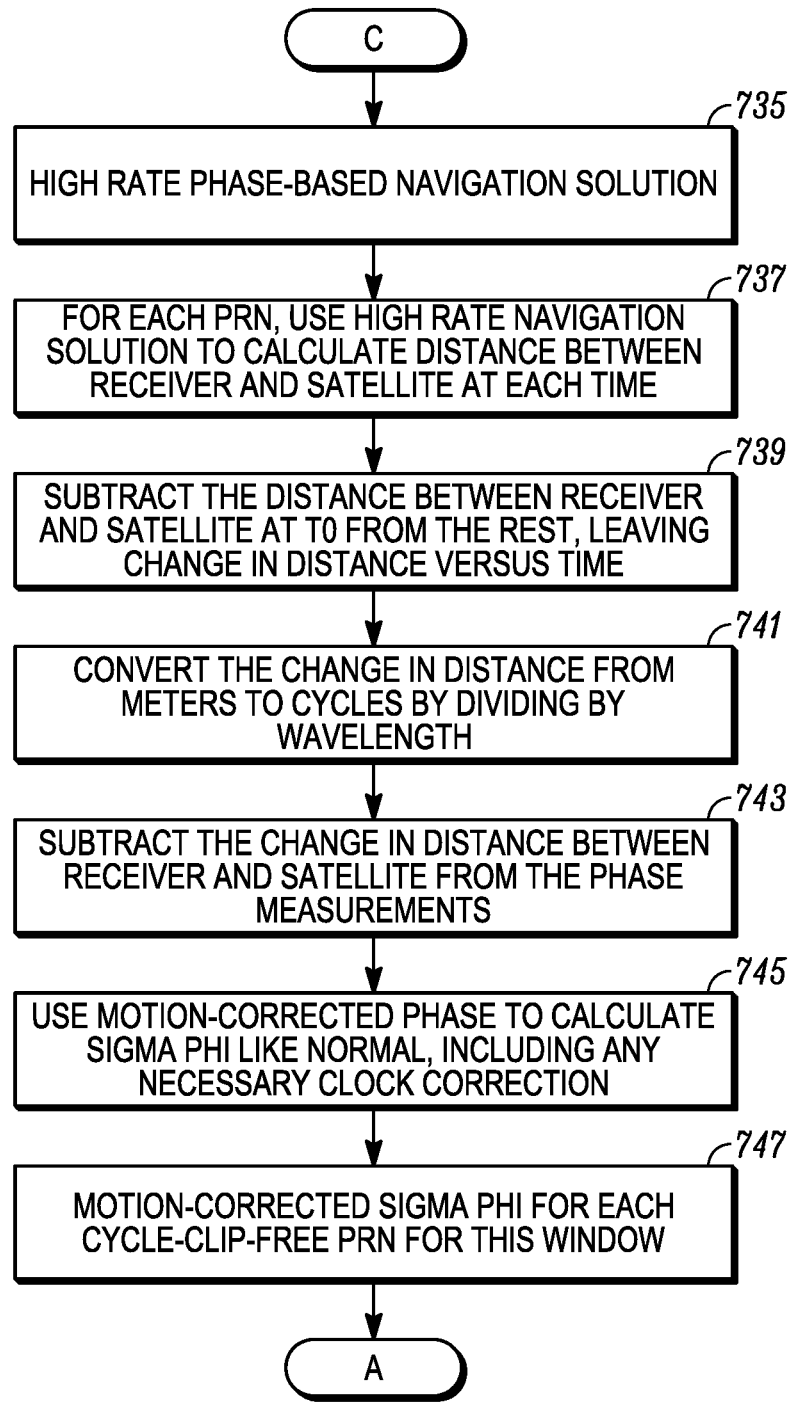

FIGS. 7A-7C illustrate exemplary flow diagrams of a motion-corrected $\sigma\Phi$ calculation process for a monitoring device according to an embodiment.

In an application where a monitoring device is used in an oceanic environment, the effect of the antenna motion due to the oceanic environment needs to be accounted for versus a traditional land-based monitoring device. The effect of antenna motion due to the oceanic environment includes periodic oscillation in the amplitude of the GPS signals being tracked (increased $S_4$) as the monitoring device pitches and rolls while riding the waves of the oceanic environment. Also, the translational motion of the antenna will advance and retard phase measurements (increased $\sigma\Phi$). Such effects of the antenna motion on $\sigma\Phi$ and $S_4$ may be processed using a multipath mitigation algorithm.

The following settings for the processing algorithm performed by the DSP 230 is recognized as preferable for computing the motion-corrected $\sigma\Phi$ in an empirical study as will be discussed with respect to FIGS. 12A-12E: EML chip spacing of 0.1; PLL bandwidth of 40 Hz, and DLL bandwidth of 0.05 Hz.

Motion-corrected $\sigma\Phi$ calculation process 700 starts with step 711 to read a 50-100 second window of high rate phase and low rate (or high rate if available) pseudorange, and status flag. Generally, scintillation may be calculated using windows of around 1 minute, hence the 50-100 second window.

Next, the phase, pseudorange, and status flag are interpolated onto a common high rate timestamp in step 713. The interpolation may be done using interpolation methods as known now or may be later derived (e.g., linear or quadratic interpolation). As every PRN has its own time series but with an offset of a certain time (e.g., on the order of ms), the interpolation obtains further resolution of the data on an integrated carrier phase. In an embodiment, a linear interpolation may be computed at around 100 Hz, and quadratic interpolation may be computed at around 25 Hz.

Next, the corresponding validity and cycle slip flags of the data are used to assign a unique arc number to each continuous high rate phase arc in step 715. In an embodiment, each PRN may correspond to around 10 seconds worth of data for a usable arc data. Referring to FIG. 11A, PRN 13 includes a complete arc 1 in a 100 seconds window. Referring to FIG. 11B, PRN 17 includes an incomplete arc 2 of less than 20 seconds of valid data because the signal was dropped. Referring to FIG. 11C, PRN 20 includes an arc 3 for around 90 seconds and a slip at around the 90 seconds point before the data continues with arc 4 after the slip.

Next, an approximately one (1) second decimated copy of all data is made in step 717. In an embodiment step 717 may be optional and helps speed up the calculation process depending on the application (e.g., generally, the calculation requires no more than 1 s resolution).

Next, the decimated pseudorange is used to calculate an approximate receiver location in step 719. In an embodiment, a standard GPS navigation solution may be used.

Next, the approximate receiver location is used to add ionospheric, tropospheric, and relativistic corrections to the decimated phase in step 721.

Next, the corrected decimated phase is used to solve the phase ambiguity for each arc in step 723. In this step 723, the solution may be derived using the process as disclosed in Joseph M. Strus, et al., "Precise Point Positioning Method for a Static Survey in a High Multipath Environment," ION GNSS 17th International Technical Meeting of the Satellite Division, 21-24 September 2004, p. 1856-63, which is herein incorporated by reference in its entirety.

Next, any arcs that are not continuous for the entire time range are filtered out in step 725. For example, non-continuous arcs may include invalid arcs as illustrated in FIG. 11B and non-cycle slip free arcs as illustrated in FIG. 11C.

Next, the calculated ambiguity is added into the high rate phase for each arc in step 727. In an embodiment, the offset may be the average or DC response of the high rate phase for a window.

Next, the receiver location is used to add ionospheric, tropospheric, and relativistic corrections to the unambiguous high rate phase in step 729. This step 729 is the same as step 721 but applied to the high rate corrected phase data instead of the decimated data. This step 729 is optional depending on the precision needed for the application.

Next, the satellite positions are checked to ensure for this time range the satellite positions are computed using a single set of ephemerides to avoid discontinuities in step 731. This step 731 is used as a check to ensure the positions are correct by using the ephemerides as another way to calculate the satellite's location.

Next, the corrected unambiguous high rate phase is used to calculate the high rate receiver position during this 50-100 seconds window in step 733. This step 733 is the same as step 719 but uses the high rate corrected phase data instead of the decimated pseudorange data.

Next, the high rate phase-based navigation solution is produced in step 735. The high rate phase-based navigation solution indicated where the receiver is at every 10 ms in the window.

Next, for each PRN, the high rate navigation solution is used to calculate the distance between the receiver and the satellite at each time in step 737.

Next, the distance between the receiver and the satellite at to is subtracted from the rest, leaving the change in distance versus time in step 739. This step 739 is optional depending on the application; for example, for calculating only the change in the distance, calculating the absolute distance is not needed. In an embodiment, to refers to the first point (and distance) between the receiver and the satellite. In another embodiment to may refer to a reference point or distance may refer to a defined reference distance.

Next, the change in distance is converted from meters to cycles by dividing by the wavelength in step 741. For example, the wavelength is approximately 20 cm for GPS $L_1$ frequency at 1.57542 GHz. Similarly, GPS $L_2$ wavelength may also be used for the corresponding signal.

Next, the change in distance between the receiver and the satellite from the phase measurements is subtracted in step 743. In this step 743, the local motion of the monitoring device is thus removed or reduced through the subtracted change in the distance between the receiver and the satellite because the change in the distance should only include satellite motion if the monitoring device is stationary.

Next, the motion-corrected phase is used to calculate the $\sigma\Phi$ as described in $\sigma\Phi$ calculation process 600 in step 745.

Next, the motion-corrected $\sigma\Phi$ for each cycle-slip-free PRN for this window is produced in step 747.

Figure 8A:
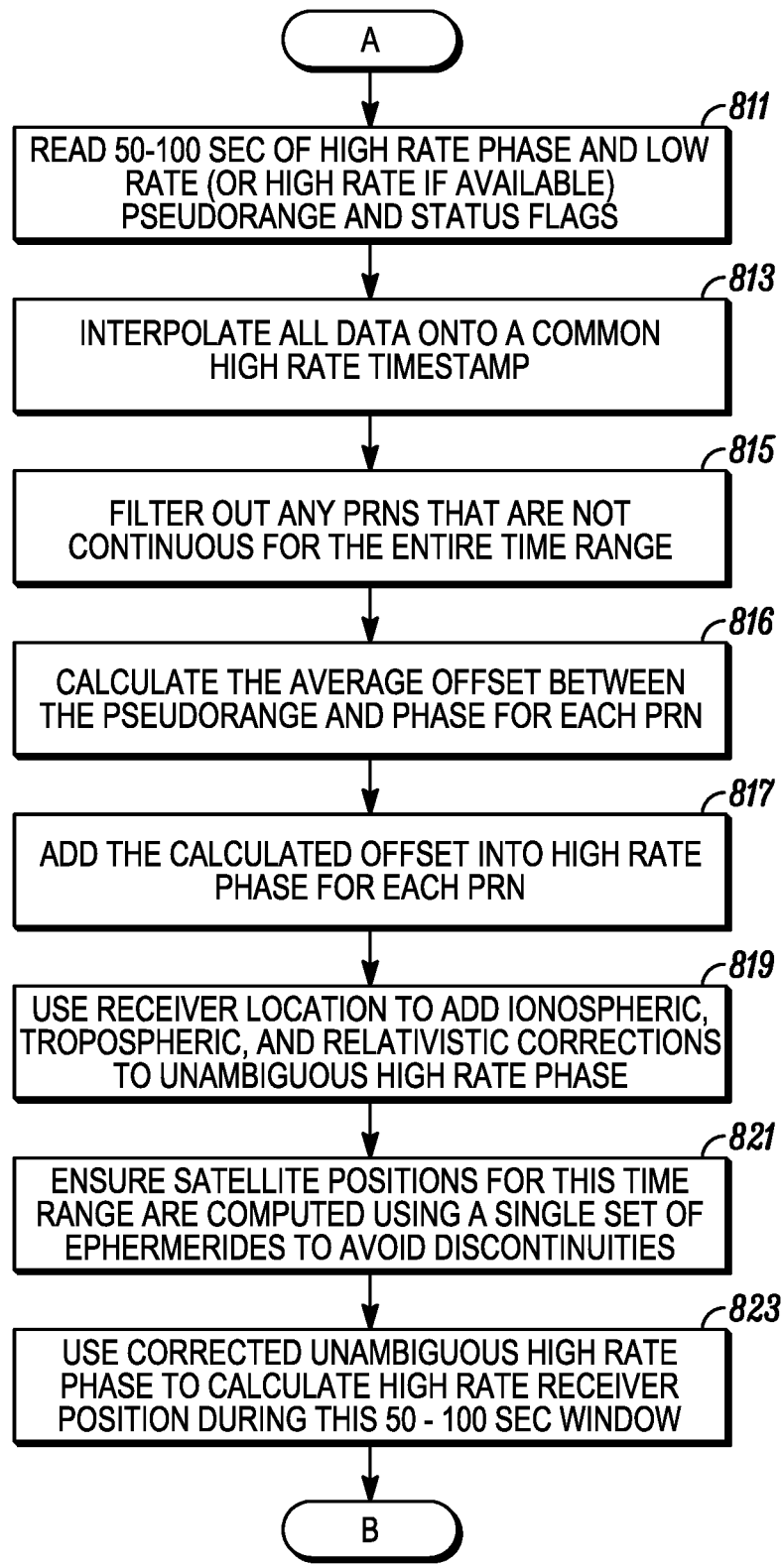
FIGS. 8A-8B illustrates an exemplary flow diagram of a motion-corrected $\sigma\Phi$ calculation process for a monitoring device according to an embodiment.
Figure 8B:
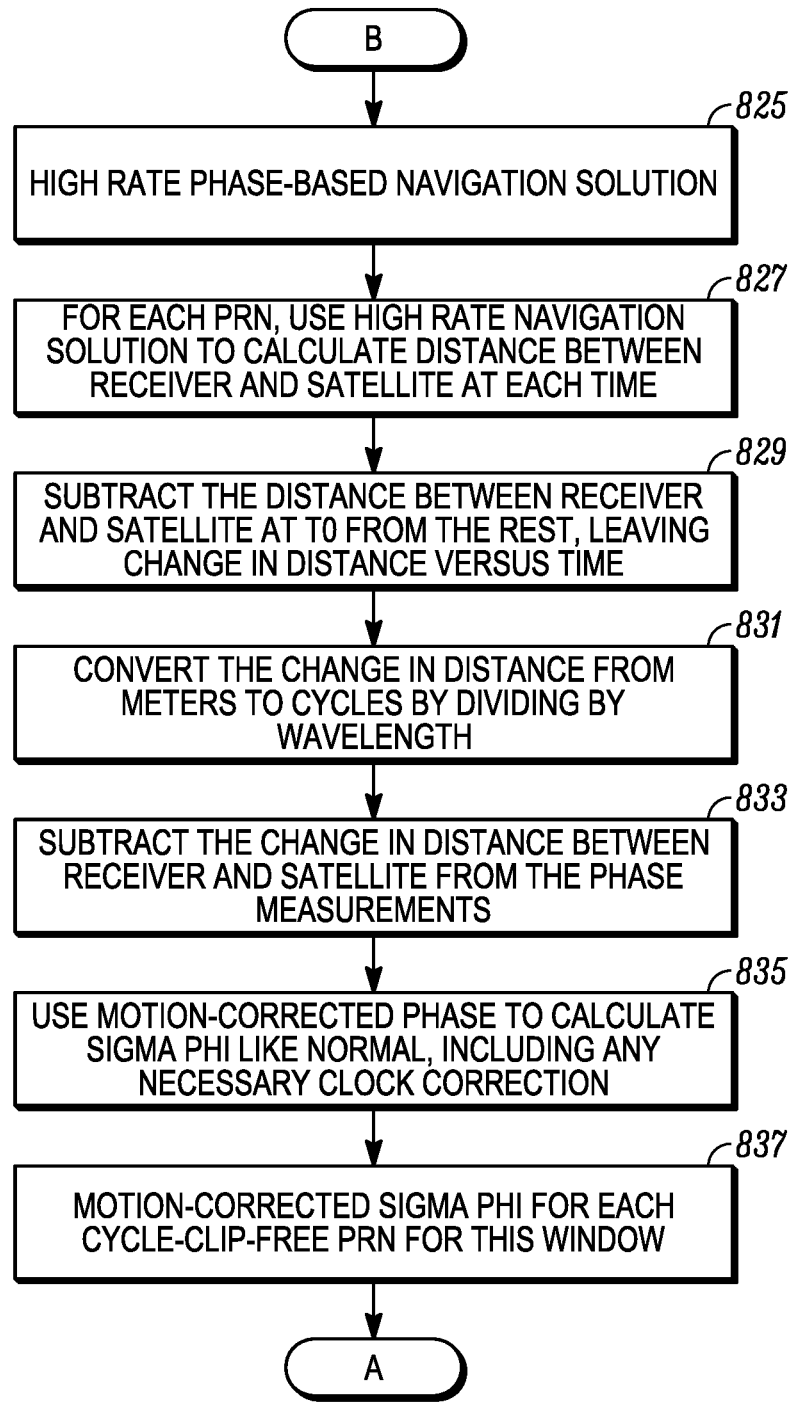

FIGS. 8A-8B, illustrates an exemplary flow diagram of a motion-corrected $\sigma\Phi$ calculation process for a monitoring device according to an embodiment.

The $\sigma\Phi$ calculation process 800 is similar to the $\sigma\Phi$ calculation process 700 as discussed above with respect to FIG. 7. In particular, a different between $\sigma\Phi$ calculation process 700 and $\sigma\Phi$ calculation process 800 is the elimination of steps 715 to 723 from the $\sigma\Phi$ calculation process 700. For the specific application of calculating $\sigma\Phi$, it is recognized that a navigation solution that includes absolute receiver location is not required (e.g., the approximate receiver location as calculated in step 719 need not be known) because the desired result is the change in the distance between the receiver and the satellite. As such, the calculation in steps 715 to 723 may be eliminated in order to save processing time and power. In particular, step 723 is generally performed using a large matrix inversion and may need PRNs from at least five satellites. In an embodiment, if drift of the monitoring device occurs within the 50-100 s window (e.g., the monitoring device has lateral movement, such as moved by waves in the ocean, that changes the absolute location of the monitoring device), the calculated $\sigma\Phi$ may be passed through a high pass filter in order to filter out the drift.

The following settings for the processing algorithm performed by the DSP 230 is recognized as preferable for computing the motion-corrected $\sigma\Phi$ in an empirical study as will be discussed with respect to FIGS. 12A-12E: EML chip spacing of 0.1; PLL bandwidth of 40 Hz, and DLL bandwidth of 0.05 Hz.

Motion-corrected $\sigma\Phi$ calculation process 800 starts with step 811 to read a 50-100 second window of high rate phase and low rate (or high rate if available) pseudorange, and status flag. Generally, scintillation may be calculated using windows of around 1 minute, hence the 50-100 second window.

Next, the phase, pseudorange, and status flag are interpolated onto a common high rate timestamp in step 813. The interpolation may be done using interpolation methods as known now or may be later derived (e.g., linear or quadratic interpolation). As every PRN has its own time series but with an offset of a certain time (e.g., on the order of ms), the interpolation obtains further resolution of the data on an integrated carrier phase. In an embodiment, a linear interpolation may be computed at around 100 Hz, and quadratic interpolation may be computed at around 25 Hz.

Next, PRN that is not continuous for the entire time range is filtered out in step 815. In an embodiment, the corresponding validity and cycle slip flags of the data are used to filter out the non-continuous PRNs. For example, the non-continuous PRN as illustrated in FIG. 11B may include a corresponding validity flag and non-cycle slip free PRN as illustrated in FIG. 11C may include a corresponding cycle slip flag.

Next, the average offset between the pseudorange and phase for each PRN is calculated 816. In an embodiment, the offset may be the average difference between the phase and the pseudorange for a window. Next, the calculated offset is added into the high rate phase for each PRN in step 817.

Next, the receiver location is used to add ionospheric, tropospheric, and relativistic corrections to the unambiguous high rate phase in step 819.

Next, the satellite positions is checked to ensure for this time range the satellite positions are computed using a single set of ephemerides to avoid discontinuities in step 821. This step 821 is used as a check to ensure the positions are correct by using the ephemerides as another way to calculate the satellite's location.

Next, the corrected unambiguous high rate phase is used to calculate the high rate receiver position during this 50-100 seconds window in step 823.

Next, the high rate phase-based navigation solution is produced in step 825. The high rate phase-based navigation solution indicated where the receiver is at every 10 ms in the window.

Next, for each PRN, high rate navigation solution is used to calculate the distance between the receiver and the satellite at each time in step 827.

Next, the distance between the receiver and the satellite at to is subtracted from the rest, leaving the change in distance versus time in step 829. This step 829 is optional depending on the application; for example, for calculating only the change in the distance, calculating the absolute distance is not needed. In an embodiment, to refers to the first point (and distance) between the receiver and the satellite.

Next, the change in distance is converted from meters to cycles by dividing by the wavelength in step 831. For example, the wavelength is approximately 20 cm for GPS $L_1$ frequency at 1.58 GHz. Similarly, GPS $L_2$ frequency at 1227.60 GHz wavelength may also be used for the corresponding signal.

Next, the change in distance between the receiver and the satellite from the phase measurements is subtracted in step 833. In this step 833, the local motion of the monitoring device is thus removed or reduced through the subtracted change in the distance between the receiver and the satellite because the change in the distance should only include satellite motion if the monitoring device is stationary.

Next, the motion-corrected phase is used to calculate the $\sigma\Phi$ as described in $\sigma\Phi$ calculation process 600 in step 835. As discussed above, a high pass filter may be used on the calculated $\sigma\Phi$ in order to remove any draft of the monitoring device Next, the motion-corrected $\sigma\Phi$ for each cycle-slip-free PRN for this window is produced in step 837.

Figure 9:
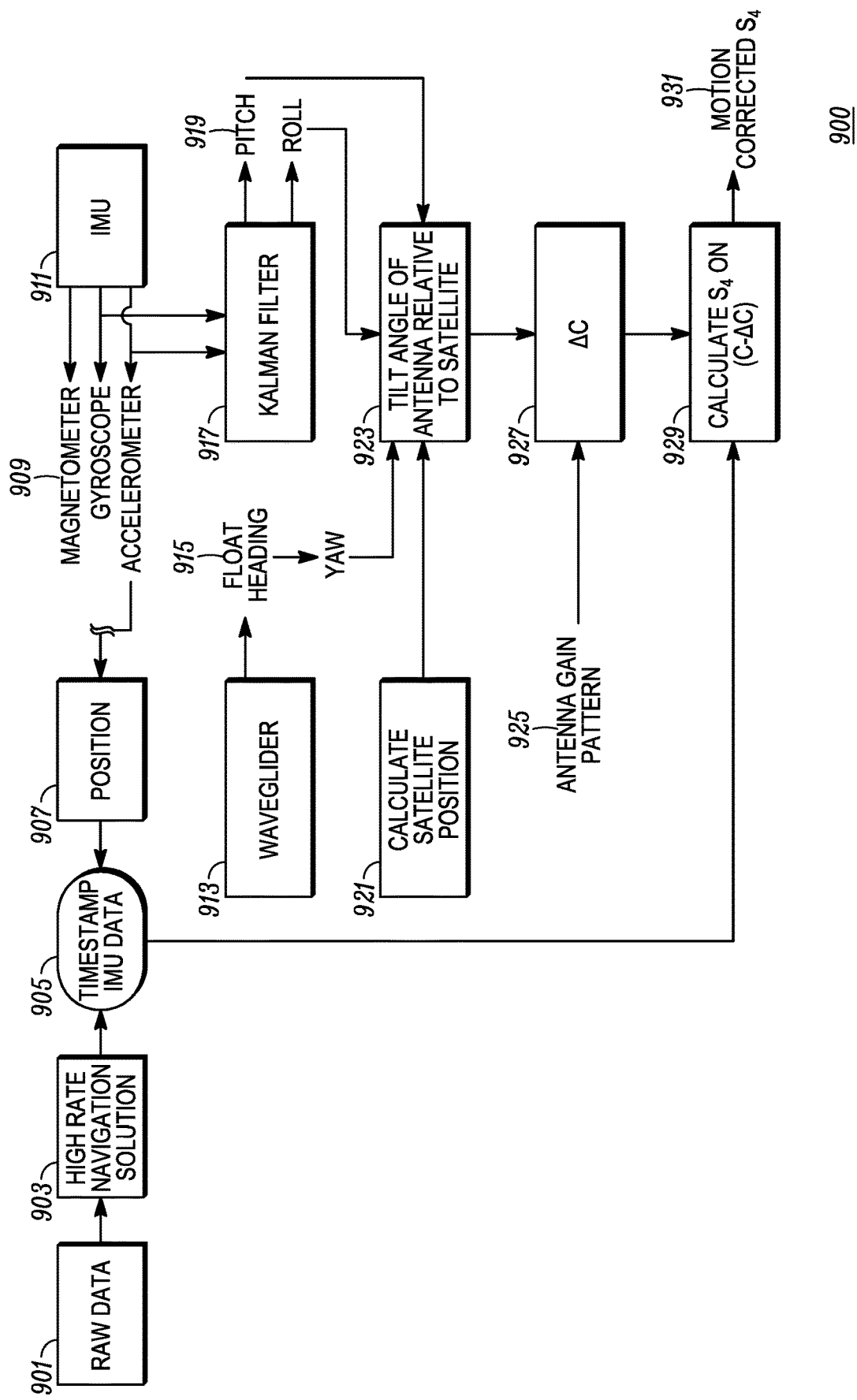
FIG. 9 illustrates an exemplary flow diagram of a motion-corrected S4 process for a monitoring device according to an embodiment.

FIG. 9 illustrates an exemplary flow diagram of a motion-corrected $S_4$ process for a monitoring device according to an embodiment.

The rocking of the antenna 290 for a monitoring device 200 deployed at a non-fixed location, but it induces periodic $C/N_0$ variation due at least partly to non-uniform antenna gain pattern from rocking motion of a monitoring device 200 due to riding the waves in the ocean, which artificially raises the measured $S_4$ index for a monitoring device 200 deployed. An inertial measurement unit (IMU) may be used to monitor antenna rocking, which, in combination with the antenna gain pattern, will enable the removal of the effect of rocking from the signal amplitude before calculating $S_4$.

In a preferred embodiment, an IMU may include a three-axis accelerometer, gyroscope, and magnetometer that provide the pitch, yaw, and roll component of the motion of the monitoring device 200. Assuming that the measurements from the IMU are accurate, the change in the GPS signal amplitude is a function of the tilt angle of the antenna relative to the satellite and the gain pattern of the respective antenna. The resulting change in the GPS signal amplitude may then be corrected to the GPS signal amplitude so that a more accurate $S_4$ index may be calculated.

However, IMUs may not be relatively accurate in providing the pitch, yaw, and roll measurements of the monitoring device 200. In one embodiment, an array of IMU may be used and averaged for this process to get better measurements. In another embodiment, an alternate method may be to use data of a time-synchronized IMU so that the characterization of the pitch, roll, and yaw of the monitoring device 200 is in sync with the high rate phase data. An implementation of the motion-corrected $S_4$ process 900 is as follows.

In an embodiment, the motion-corrected $S_4$ process 900 may be performed for a monitoring device 200, a support module 400, or on a platform (e.g., a floating platform) that have motion in sync with the monitoring device 200. The IMU 911 is placed on the monitoring device 200, the support module 400, or the platform to measure the respective motions of the monitoring device 200 using a combination of one or more magnetometer, gyroscope, and accelerometer 909 of the IMU 911. In an embodiment, the pitch and roll components 919 of the motion may be derived by passing the data from the gyroscope and the accelerometer through a Kalman Filter 917. The yaw component may be derived from the magnetometer. In an embodiment, the yaw component 915 may be derived from a separate magnetometer that is installed on the monitoring device 200, the support module 400, or the waveglider 913 or other platform. This may be needed due to inaccuracies in the IMU 911. The waveglider 913 provides a float heading that translates the yaw component 915.

The relative position 907 may be derived from the accelerometer, e.g., calculated with a double integral. The relative position 907 is used for matching with the data from the GPS calculation. In one embodiment, the data from GPS calculated in the motion-corrected $\sigma\Phi$ process 700 or motion-corrected $\sigma\Phi$ process 800. For example, one data from the GPS calculation that may be useful is the satellite position 921. In an embodiment, the raw data from the GPS 901 is used to calculate the high rate phase navigation solution 903; this is also available from the motion-corrected $\sigma\Phi$ process 700 or motion-corrected $\sigma\Phi$ process 800. The IMU data is cross-correlated and fitted with the high rate phase navigation solution in order to align both data into a common time. In an embodiment, data fitting techniques as now known or later derived may be used. In an alternate embodiment, the cross-correlation and the fitting may be done manually.

With a measurement of yaw 915 and pitch and roll 919, the title angle of the antenna relative to the GPS satellite may be determined using the calculated satellite position 921. This calculated satellite position 921 may be determined in the motion-corrected $\sigma\Phi$ process 700 or motion-corrected $\sigma\Phi$ process 800. Using the antenna gain pattern 925, the change in the GPS signal amplitude 927 may be determined according to the tilt angle of the antenna relative to the GPS satellite 923 as a function of the antenna gain pattern 925, The $S_4$ 929 may be calculated based on difference of the gain of the antenna without a tilt angle relative to the satellite and with change in the GPS signal amplitude 927 due to the tilt angle. As such, the motion corrected $S_4$ 931 may be calculated.

Figure 10A:
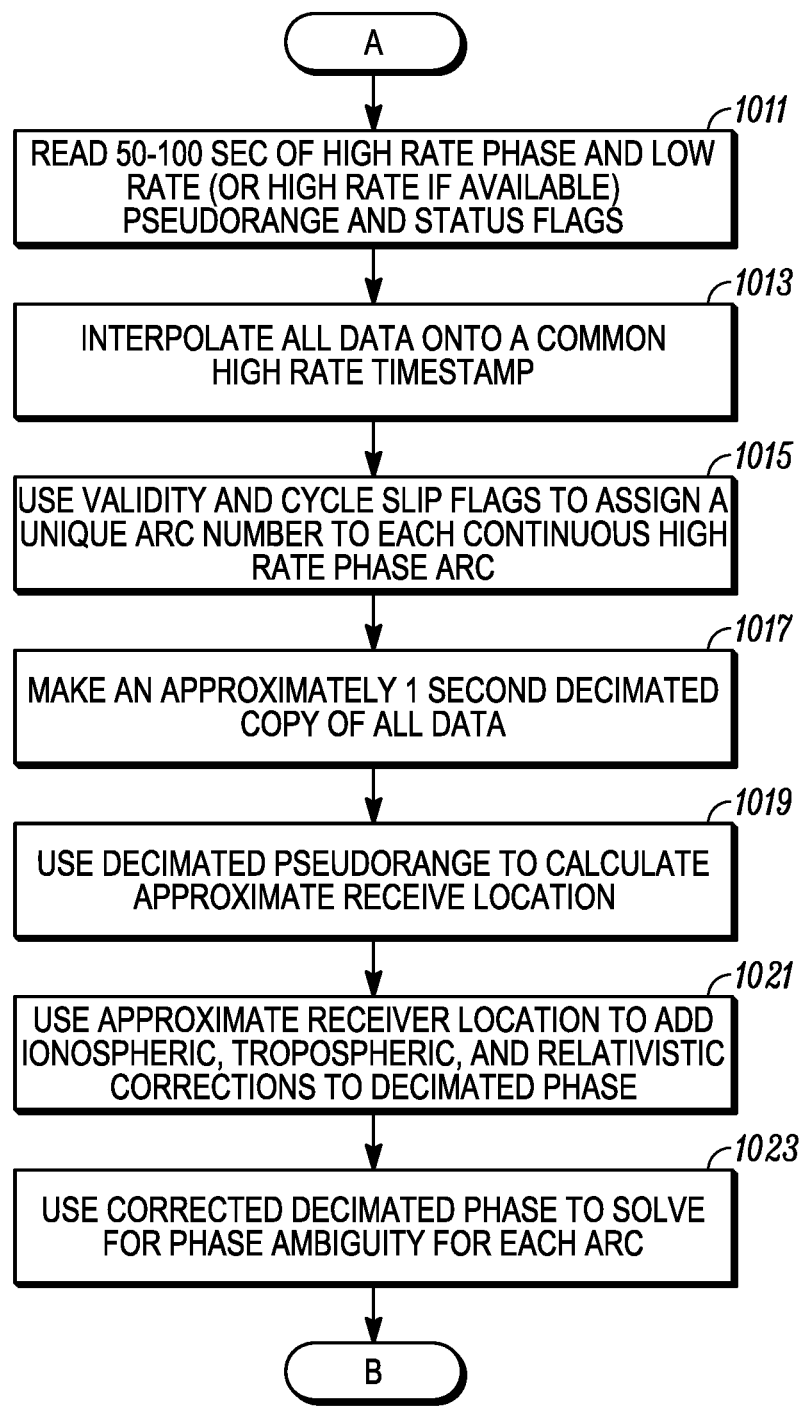
FIGS. 10A-10B illustrate exemplary flow diagrams of a wave height calculation process for a monitoring device according to an embodiment.
Figure 10B:
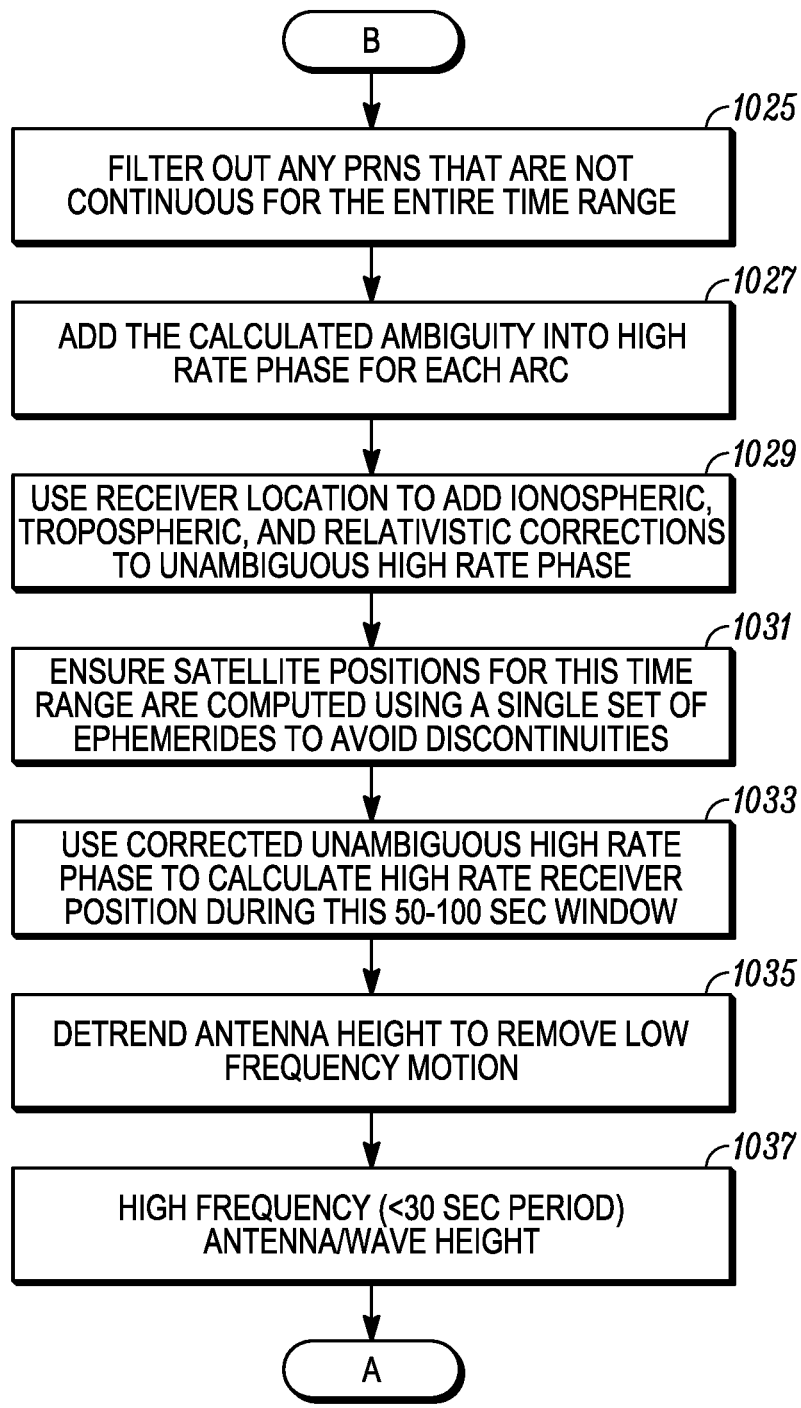

FIGS. 10A-10B illustrate exemplary flow diagrams of a wave height calculation process for a monitoring device according to an embodiment.

It is noted that the wave height calculation process 1000 uses similar steps as the motion-corrected σΦ process 700 or motion-corrected σΦ process 800. For example, the steps 1011 to 1033 corresponds with steps 711 to 733 of process 700 and steps 811 to 823 of process 800. As such, the calculations of the GPS signals from the process 700 or process 800 may be reused for the wave height calculation process 1000.

Wave height calculation process 1000 starts with step 1011 to read a 50-100 second window of high rate phase and low rate (or high rate if available) pseudorange, and status flag.

Next, the phase, pseudorange, and status flag are interpolated onto a common high rate timestamp in step 1013.

Next, the corresponding validity and cycle slip flags of the data are used to assign a unique arc number to each continuous high rate phase arc in step 1015.

Next, an approximately one (1) second decimated copy of all data is made in step 1017. This step 1017 may be optional because the receiver location is not ultimately needed for the calculation as discussed with respect to FIG. 8A.

Next, the decimated pseudorange is used to calculate an approximate receiver location in step 1019. This step 1019 may be optional because the receiver location is not ultimately needed for the calculation as discussed with respect to FIG. 8A.

Next, the approximate receiver location is used to add ionospheric, tropospheric, and relativistic corrections to the decimated phase in step 1021. This step 1021 may be optional because the receiver location is not ultimately needed for the calculation as discussed with respect to FIG. 8A.

Next, the corrected decimated phase is used to solve the phase ambiguity for each arc in step 1023. This step 1023 may be optional because the absolute receiver location is not ultimately needed for the calculation as discussed with respect to FIGS. 8A-8B.

Next, any arcs that are not continuous for the entire time range are filtered out in step 1025.

Next, the calculated ambiguity is added into the high rate phase for each arc in step 1027.

Next, the receiver location is used to add ionospheric, tropospheric, and relativistic corrections to the unambiguous high rate phase in step 1029.

Next, the satellite positions are checked to ensure for this time range the satellite positions are computed using a single set of ephemerides to avoid discontinuities in step 1031.

Next, the corrected unambiguous high rate phase is used to calculate high rate receiver position during this about 50 seconds to about 100 seconds window in step 1033. As discussed with respect to FIGS. 8A-8B, the high rate receiver position calculated in this step 1033 may contain a drift of the monitoring device 200 unaccounted for. This drift can be removed using a high pass filter, which will be discussed with respect to steps 1035 and 1037.

Next, the antenna height is detrended to remove low frequency motion in step 1035. In an embodiment, the coordinates of the receiver position (as calculated in step 1033) may be transferred as a height of the antenna, e.g., by calculating Euclidean distance. The low frequency motion is the difference between the known length of the GPS antenna and the calculated height of the antenna from the receiver position. In an embodiment, a high pass filter may be used to remove any low frequency component of the motion, which may be an indication of drifting of the monitoring device 200 rather than the cyclical motion of a wave. In an embodiment, the high frequency component may be defined as the motion component with a period greater than 30 seconds.

Next, the high frequency (less than about a 30 second period) antenna/wave height is produced in step 1037.

In an embodiment, the wave height calculation process 1000 may be used for other applications such as tsunami detection and warning. For example, a number of monitoring devices 200 may be deployed at various locations tracking the wave height at each location. A number of monitoring devices 200 at a region or near a coastal area that is tracking abnormally high wave height may indicate a tsunami at the region or near the coastal area. In a further embodiment, the data may be aggregated by a server as packaged data as discussed with respect to steps 543 and 544 in FIG. 5C.

FIGS. 11A-11C illustrate exemplary PRNs according to an embodiment.

Referring the FIG. 11A, the PRN 13 contains an arc 1 that is continuous over the range of the 100 s window. Referring to FIG. 11B, the PRN 17 contains an invalid arc 2 that contains data for less than 20 s. Referring to FIG. 11C, the PRN 20 contains an arc 3 from 0 s to around 90 s, a slip at around 90 s, and an arc 4 from around 90 s to 100 s.

FIGS. 12A-12E illustrate σΦ measurements and calculations for a test of a monitoring device according to an embodiment.

The approximately 32 hour ocean test was conducted on off the coast of Hawaii. A GPS data acquisition system was deployed to record the raw GPS $L_1$ spectrum from the ocean using the Liquid Robotics Wave Glider SV2 platform. The raw data acquisition system consisted of a GPS RFE board which downconverts the GPS $L_1$ spectrum to an intermediate frequency, and then samples it at 5.7 MHz. This data was read by an embedded Linux computer connected to a USB acquisition board, and then saved to a local hard drive for post-processing. An IMU was also installed on the platform to record 50 Hz 3-axis accelerometer, gyro, and magnetometer data to study the wave motion itself during the test.

This raw GPS data set was post-processed to acquire and track the GPS signals present in the recorded spectrum. Different combinations of EML spacing, PLL loop order, PLL bandwidth, and DLL bandwidth were tested to study the effect of each parameter on GPS tracking performance, measurement accuracy, and noise level from this mobile platform. These same combinations of parameters were also tested on data from a stationary antenna in Boulder, CO to investigate their effect on measurement accuracy and noise level for a stationary reference station.

The result of this analysis is a highly optimized set of GPS tracking parameters for an ocean-going vehicle to significantly improve GPS tracking performance with minimal impact on data quality. Once the optimal settings were determined, that data set was used as the baseline for testing several antenna motion removal algorithms for improving σΦ and $S_4$ calculations on a moving platform.

Figure 12A:
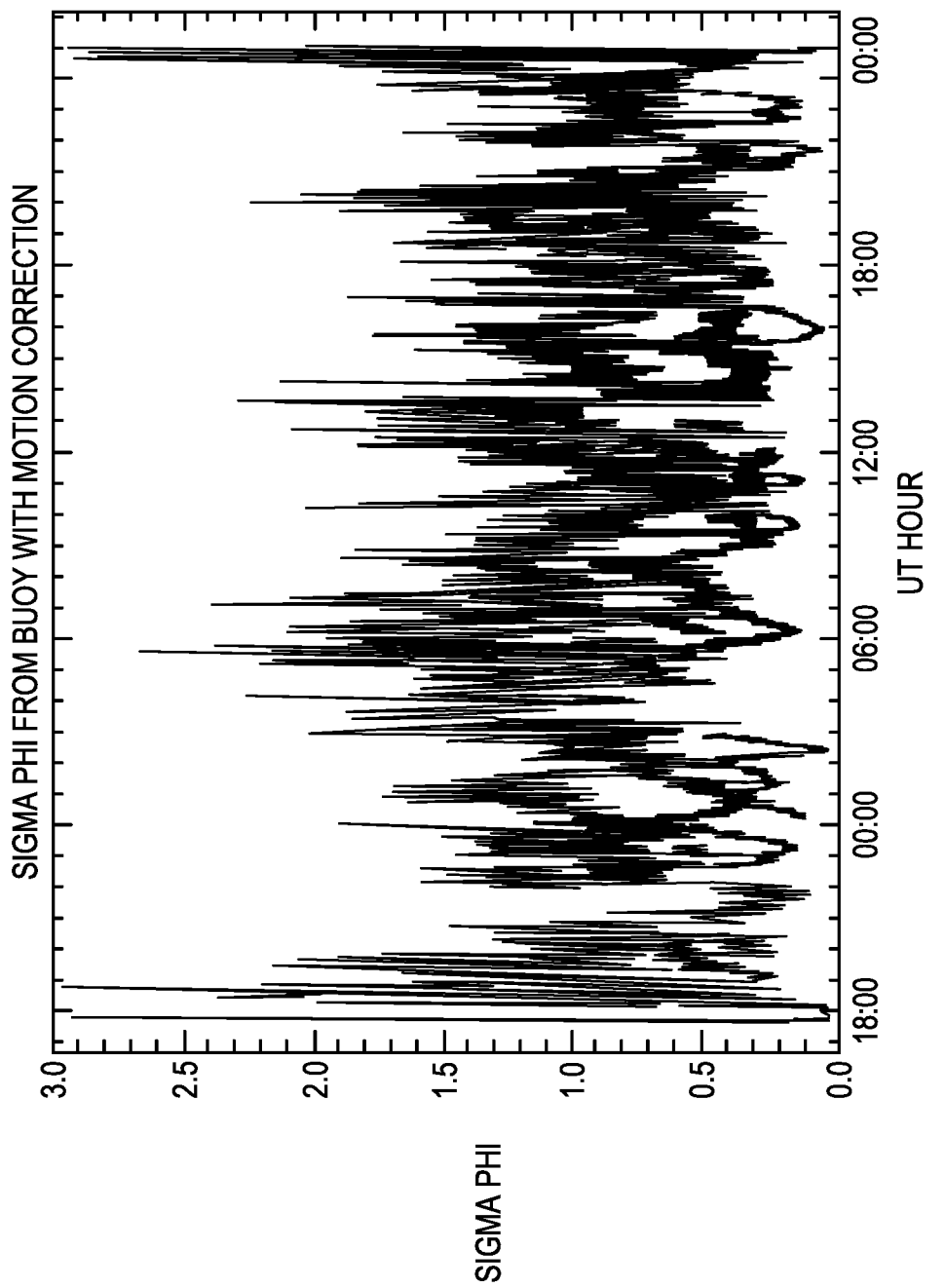
FIGS. 12A-12E illustrate $\sigma\Phi$ measurements and calculations for a test of a monitoring device according to an example of the invention.
Figure 12B:
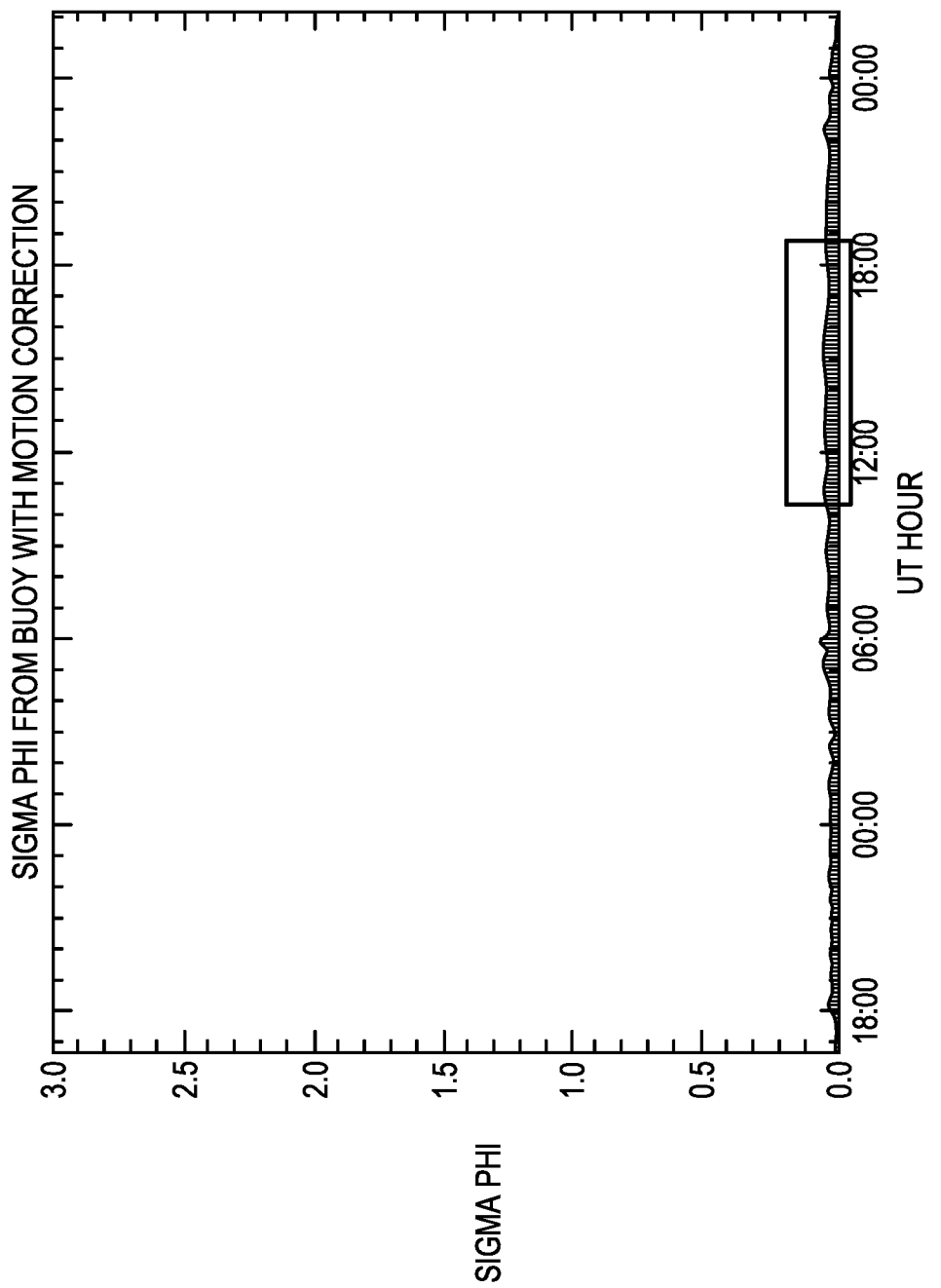

FIG. 12A shows the σΦ from the buoy without motion correction. FIG. 12B shows the σΦ from the buoy with motion correction.

Figure 12C:
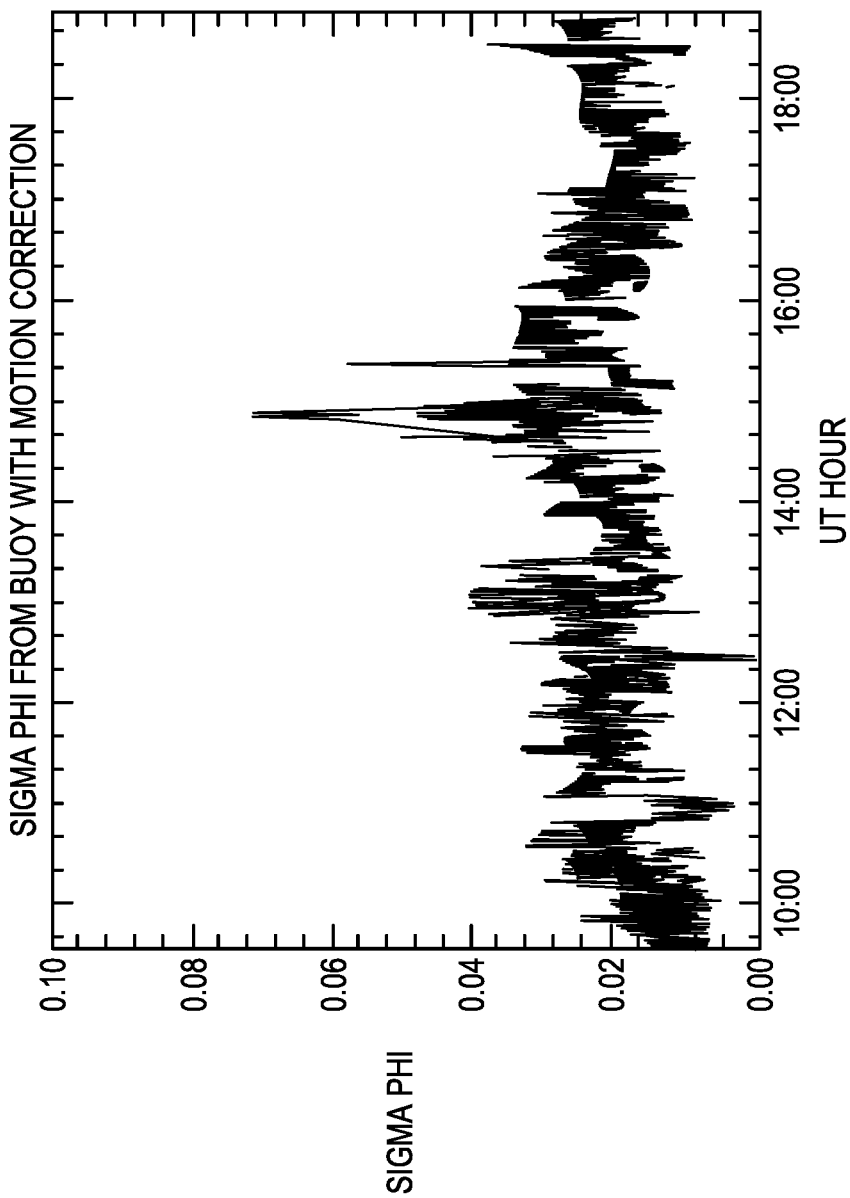

FIG. 12C shows an enlarged view of the σΦ from the buoy with motion correction as shown in FIG. 12B. This is compared with the σΦ from the ground station shown in FIG. 12D and the MKEA ROTI index shown in FIG. 12E.

EXAMPLE

Without intending to limit the scope of the invention, the following example illustrates how various embodiments of the invention may be made and/or used.

This Example illustrates the deployment of a monitoring device in an oceanic environment and the calculating of the ionospheric scintillation and the wave height.

In this Example, the experimental setup included a monitoring device mounted on a liquid robotics wave glider SV2 platform. The monitoring device was configured to record raw GPS $L_1$ spectrums. The monitoring device included an antenna, radio frequency front end (RFE) hardware, USB digital acquisition board, embedded Linux computer, and storage device.

The antenna was an Antcom 53G1215A-XT-1 dual frequency active GPS patch antenna for receiving a radio signal from a number of GPS satellites.

The radio frequency front end (RFE) hardware was configured to down convert the GPS $L_1$ spectrum to an intermediate frequency of 1.610476 MHz. The GPS RF front end board was the custom front end board used in ASTRA'S SM-211 Dual Frequency Software GPS receiver. The data sheet describing the SM-211 receiver is hereby incorporated herein by reference.

The USB digital acquisition board was configured to read the serial data stream from the RFE board and send it over USB to the Linux computer. The USB digital acquisition board was an ACCES I/O USB-DI16A.

The embedded Linux computer was configured to read the digital data stream from the USB digital acquisition board, as well as the digital data stream from the IMU, and write both data sets to a local storage device. The embedded Linux computer was a fit-PC2 2 GB/2 GHz model with Linux Mint installed.

The storage device was configured to record the raw data from the USB digital acquisition board and the IMU. The storage device was an Intel SSDSA2CW600G3B5 600 GB solid state drive.

An IMU was also utilized. The IMU was configured to record 50 Hz three-axis accelerometer, gyro, and magnetometer data to study the wave motion itself during this example. The IMU was a CH Robotics UM6 orientation sensor.

The monitoring system and IMU were installed/affixed to the Liquid Robotics Wave Glider SV2 is an unmanned autonomous marine robot to use only the ocean's endless supply of wave energy for propulsion. It is described with reference to U.S. Pat. No. 7,371,136, which is hereby incorporated by reference. It employed the monitoring system mounted in the forward payload compartment inside a sealed dry box to protect it from the ocean.

Example Method

Step 1: A 32 hour ocean test was conducted in Hawaii from 17:50 UTC on the first day to 1:30 UTC on the third day and data was obtained. The data included the raw GPS $L_1$ spectrum during that time range, including data from all 32 GPS satellites, e.g., PRN1-PRN32.

Step 2: This raw spectrum was post-processed in order to acquire and track the signals from any and all GPS satellites contained within. This process includes the calculation of all typical GNSS observables, including 100 Hz integrated carrier phase, in-phase accumulation, quadrature accumulation, GPS time, and receiver time, as well as 1 Hz pseudorange, integrated carrier phase, GPS time, receiver time, Doppler frequency, SV elevation, SV azimuth, C/NO, data validity flag, cycle slip flag, signal acquisition status, PRN, SV health, and 0.01 Hz $S_4$, $\sigma\Phi$, $\tau_0$, scintillation power ratio, GPS time, reference channel status, and PRN for each satellite being tracked, as well as 1 Hz receiver X/Y/Z position, receiver X/Y/Z GPS time, receiver time, velocity, receiver clock error, receiver clock error rate, and navigation solution flag. Over the course of the test, all 32 GPS satellites were acquired and tracked.

Referring to FIG. 12A, the calculated $\sigma\Phi$ index for the entire time range is shown. Note that this is the standard $\sigma\Phi$ index with no antenna motion correction. Each PRN is in a different color to uniquely identify them.

Step 3: The 32 hour time range was subdivided into approximately 1140 individual 100 second chucks for scintillation calculation.

Step 4: For each 100 second window, the 100 Hz phase and 1 Hz pseudorange and status flags for each GPS PRN in view was found.

Referring to FIG. 11A, 100 seconds of 100 Hz phase data collected from GPS PRN 13 is shown.

Referring to FIG. 11B, 100 seconds of 100 Hz phase data collected from GPS PRN 17 is shown.

Referring to FIG. 11C, 100 seconds of 100 Hz phase data collected from GPS PRN 20 is shown.

Step 5: For each 100 second window, the 100 Hz phase data from each PRN in view was linearly interpolated onto a common 100 Hz time scale.

Step 6: For each 100 second window and each PRN, the validity and cycle slip flags were used to divide the high rate phase time series into continuous cycle-slip free arcs.

Step 7: For each 100 second window, the 1 Hz pseudorange data was used to calculate an approximate receiver location.

Step 8: For each 100 second window and each PRN, the approximate receiver location was used to add ionospheric, tropospheric, and relativistic corrections to the 1 Hz phase data.

Step 9: For each 100 second window, the corrected 1 Hz phase data was used solve for the ambiguity in each continuous phase arc, according to the process disclosed in Joseph M. Strus, et al., "Precise Point Positioning Method for a Static Survey in a High Multipath Environment," ION GNSS 17th International Technical Meeting of the Satellite Division, 21-24 September 2004, p. 1856-63, under the section entitled "Multiple Epoch TOA", which is hereby incorporated by reference in its entirety.

Step 10: For each 100 second window, any arcs that were not continuous over the entire time range were filtered out, as they would corrupt the high rate navigation solution and prevent the accurate removal of antenna motion for all other PRNs.

Step 11: For each 100 second window and each PRN, the calculated ambiguity was added to the 100 Hz phase data.

Step 12: For each 100 second window and each PRN, the approximate receiver location was used to add ionospheric, tropospheric, and relativistic corrections to the 100 Hz phase data.

Step 13: For each 100 second window, the satellite positions were computed at 100 Hz using a static set of ephemerides, to prevent an ephemerides update from introducing a discontinuity in the resulting navigation solution.

Step 14: For each 100 second window, the 100 Hz phase data from each PRN was used to calculate the receiver position at 100 Hz.

Step 15: For each 100 second window and each PRN, the 100 Hz receiver position and 100 Hz satellite position information were used to calculate the 100 Hz distance between the receiver and the satellite.

Step 16: For each 100 second window and each PRN, the distance between the receiver and the satellite was converted from meters to cycles by dividing by the GPS $L_1$ wavelength of 0.19029367 meters/cycle.

Step 17: For each 100 second window and each PRN, the distance between the receiver and the satellite was subtracted from the 100 Hz phase data, in order to remove the effects of receiver and satellite motion from the data.

Step 18: For each 100 second window and each PRN, the 100 Hz phase data was used to calculate σΦ in the normal fashion, including the subtraction of a reference satellite to compensate for local receiver clock errors.

Referring to FIG. 12B, the resulting σΦ index for the entire time range is shown, this time including antenna motion correction. Each PRN is in a different color to uniquely identify them. This figure is shown on the same scale as FIG. 12A to highlight the amplitude of the antenna motion correction.

Referring to FIG. 12C, the resulting σΦ index for a limited time range of about 10 hours is shown. This makes clear a small increase in the σΦ index for PRN 6 at approximately 15 UT on the second day, shown in blue.

Figure 12D:
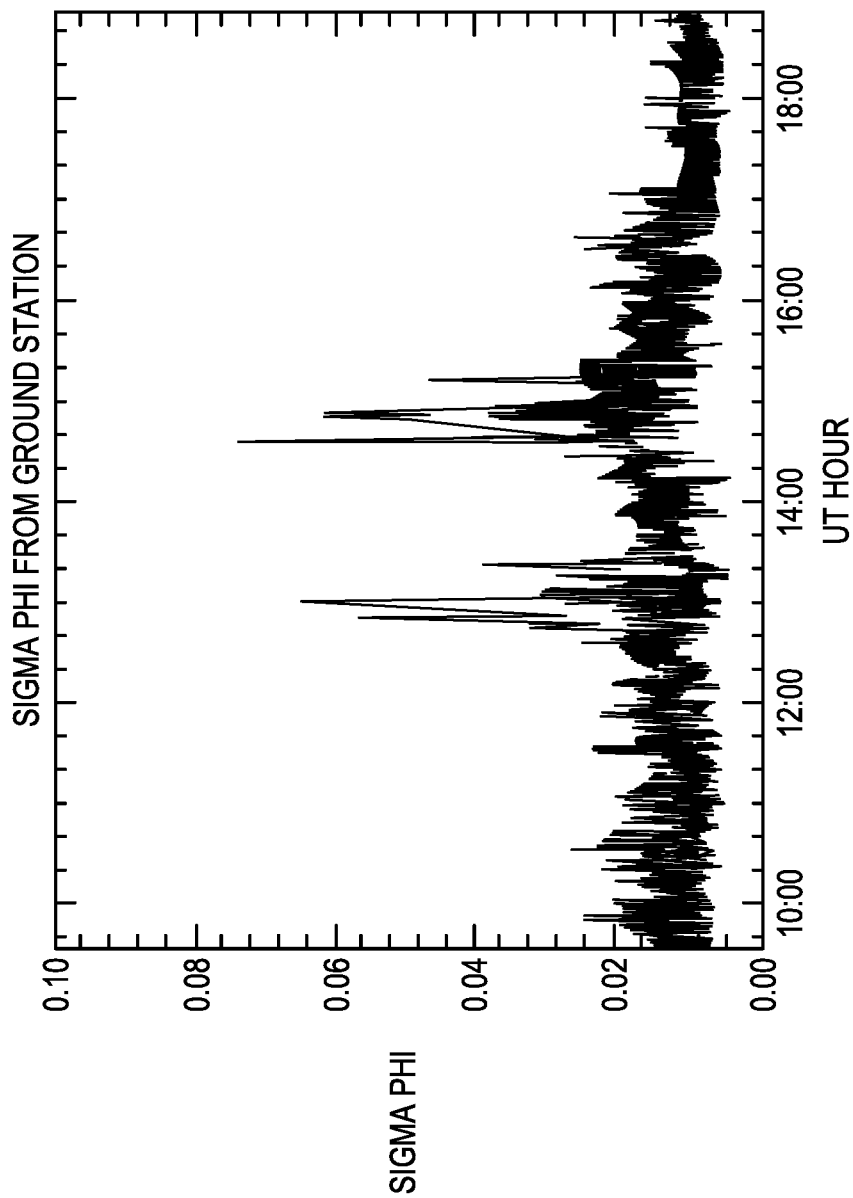

Referring to FIG. 12D, the σΦ index for a nearby CASES SM-211 receiver located on the shore nearby is shown, which identifies a similar increase in the σΦ index on PRN 6 at the same time.

Figure 12E:
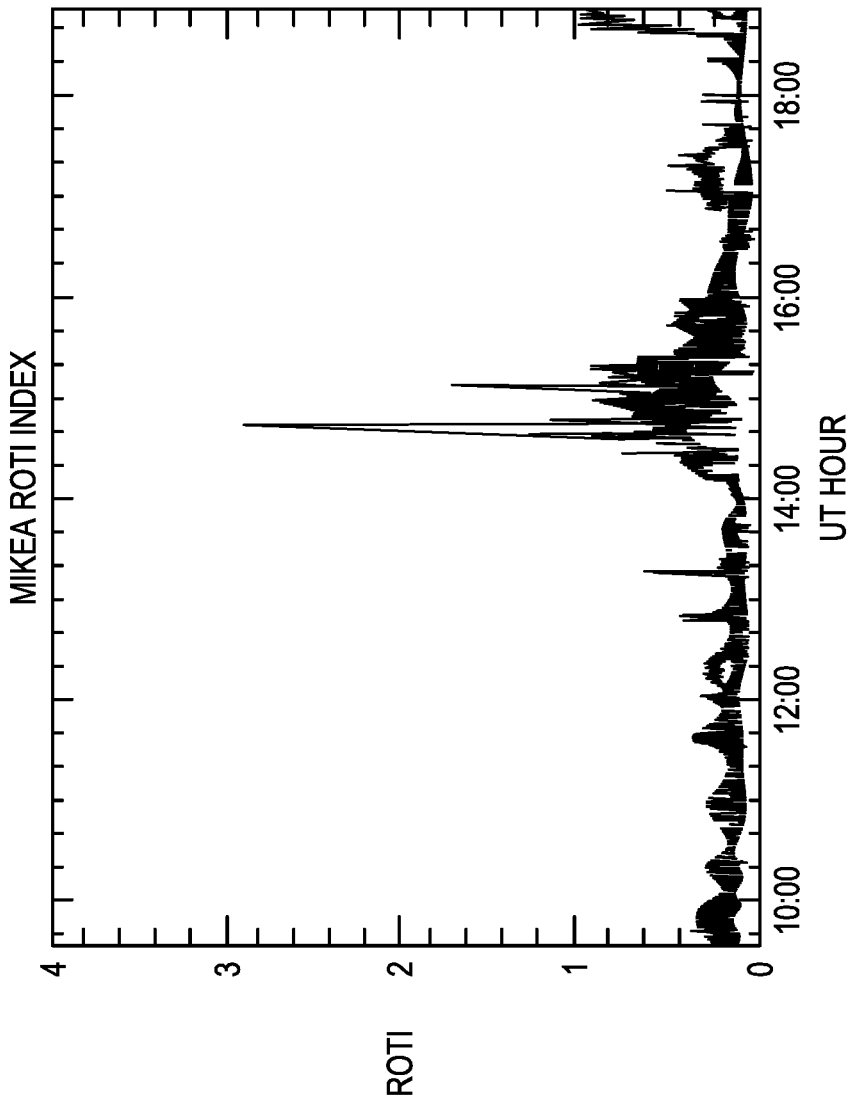

Referring to FIG. 12E, the ROTI index for a nearby CORS receiver located on Mauna Kea is shown, which identifies a similar increase in the ROTI index on PRN 6 at the same time.

The result of this Example illustrate that the motion correction algorithm undertaken to correct the σΦ index was highly effective at reducing the effect of antenna motion on this ocean-going platform, referring to the difference between FIG. 12A and FIG. 12B. This Example also illustrates that the resulting σΦ index is still sensitive enough to detect the small level of ionospheric variability seen in PRN 6 at around 15 UT on the second day, referring to FIG. 12C, FIG. 12D, and FIG. 12E.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as a discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An apparatus for calculating ionospheric scintillation, comprising:
   an antenna configured to receive one or more radio signals, each radio signal from an orbital navigation satellite located beyond an ionosphere; and
   a monitoring device, comprising:
      a radio frequency front end (RFE) electrically coupled to the antenna;
      a digital signal processor (DSP) electrically coupled to the RFE; and
      a computer electrically coupled to the DSP configured for calculating a perturbation of the one or more radio signals that is corrected of the antenna motion and for calculating the ionospheric scintillation including compensating for antenna motion by:
         determining a change in distance between the antenna and the orbital navigation satellite resulting from the antenna motion; and
         removing an effect of the change in distance resulting from the antenna motion from the ionospheric scintillation calculation.

2. The apparatus of claim 1, wherein calculating the perturbation comprises:
   interpolating a high rate phase data of the one or more radio signals in a window of time;
   calculating an offset of the high rate phase data and adding the offset to the high rate phase data as a corrected high rate phase data;
   calculating a high rate position of the monitoring device using the corrected high rate phase data;
   calculating a distance between the monitoring device and an orbital navigation satellite for each orbital navigation satellites corresponding to each radio signal using a high rate navigation solution;
   converting a change of the distance to units of cycles with reference to a wavelength of one of the one or more radio signals;
   adjusting the high rate phase data with a converted change of the distance as adjusted high rate phase data; and
   calculating a phase of the perturbation using the adjusted high rate phase data.

3. The apparatus of claim 2, wherein the computer is further configured for filtering the adjusted high rate phase data with a high pass filter to remove a drift motion of the monitoring device.

4. The apparatus of claim 1, wherein calculating the perturbation comprises:
   calculating a tilt angle of the antenna relative to the orbital navigation satellite; and
   calculating an amplitude of the perturbation based on an adjustment of a gain of the antenna at the tilt angle.

5. The apparatus of claim 4, wherein calculating the tilt angle is based on information indicative of a pitch motion, a yaw motion, and a roll motion of the antenna and a position of the orbital navigation satellite.

6. The apparatus of claim 4, wherein calculating the tilt angle comprises calculating, at a plurality of times, corresponding positions of the monitoring device;
   correlating positions of the monitoring device with positions derived from a high rate phase navigation solution of the monitoring device; and
   calculating the positions of the orbital navigation satellite corresponding to the high rate phase navigation solution correlated to the positions of the monitoring device.

7. The apparatus of claim 1, wherein the monitoring device further comprises an inertial measurement unit (IMU).

8. The apparatus of claim 1, wherein the apparatus further comprises a waveglider.

9. The apparatus of claim 1, wherein the orbital navigation satellite is one of a Global Positioning System (GPS), Global Navigation Satellite System (GLONASS), Galileo system, Indian Regional Navigation Satellite System (IRNASS), and BeiDou Navigation Satellite System (BDS).

10. The apparatus of claim 1, wherein the monitoring device is configured to be deployed in an oceanic environment.

11. The apparatus of claim 10, wherein the computer is further configured for calculating a wave height of the oceanic environment, comprising:
    calculating a high rate position of the monitoring device in a window of time; and detrending a height of the antenna to remove a low frequency motion of the monitoring device.

12. The apparatus of claim 1, further comprising a support module, the support module comprising:
    a communication modem configured for communication with a network coupled to the monitoring device;
    a power management module coupled with and configured for supplying power to the communication modem and the monitoring device; and
    a battery coupled to the power management module.

13. The apparatus of claim 12, further comprising a power source coupled to the power management module, the power source comprises one or more of a solar cell, a wind turbine, and a wave generator.

14. The apparatus of claim 1, wherein the computer is further configured for sending the perturbation to a server through a network.

15. A system configured to calculate ionospheric scintillation, comprising:
    a plurality of monitoring devices configured to receive ionospheric scintillation data through a network, at least one of the plurality of monitoring devices is configured to be located at one of a plurality of locations near an Earth's surface;

at least one of the plurality of monitoring devices is configured for receiving one or more radio signals, each radio signal from a corresponding orbital navigation satellite located beyond an ionosphere, wherein one of the plurality of monitoring devices includes an antenna configured to be in motion and an antenna motion includes one or more of a tilt motion, a yaw motion, and a roll motion; and computational equipment comprising a processor configured to:

aggregate the ionospheric scintillation data from the plurality of monitoring devices;

calculate an ionosphere weather model using the aggregated ionospheric scintillation data including correction or compensation for the antenna motion, wherein the ionosphere weather model is calculated based on ionospheric scintillation at a plurality of locations in the ionosphere based on the aggregated ionospheric scintillation data from the plurality of monitoring devices; and calculate a high frequency (HF) propagation model for facilitating radio communications using the ionosphere weather model.

16. An apparatus, comprising:

an interface configured for receiving ionospheric scintillation data from a plurality of monitoring devices through a network, the plurality of monitoring devices are configured to be located at a plurality of locations near an Earth's surface; and a processor configured to:

aggregate the ionospheric scintillation data from the plurality of monitoring devices, wherein at least one of the plurality of monitoring devices is configured for receiving one or more radio signals, each radio signal from a corresponding orbital navigation satellite located beyond an ionosphere and calculate a perturbation of the one or more radio signals that is corrected of motion of at least one of the plurality of monitoring devices wherein the motion comprises an antenna motion of at least one of the plurality of monitoring devices and the antenna motion comprises one or more of a tilt motion of an antenna, a yaw motion of the antenna and a roll motion of the antenna; and calculate an ionospheric scintillation while compensating for an antenna motion of at least one of the monitoring devices by:

determining a change in distance between the antenna and the orbital navigation satellite resulting from the antenna motion; and removing an effect of the change in distance resulting from the antenna motion from the ionospheric scintillation calculation.

17. The apparatus of claim 16, wherein the processor is further configured to calculate an ionosphere weather model using the aggregated ionospheric scintillation data and configured to calculate a high frequency (HF) propagation model using the ionosphere weather model.

18. The apparatus of claim 17, wherein the processor is further configured to calculate a transmission frequency using the HF propagation model for a location of a network device.

19. The apparatus of claim 16, further comprising a storage configured to store the aggregated ionospheric scintillation data as historical data.

20. The apparatus of claim 16, wherein at least one of the corresponding orbital navigation satellite is one of a Global Positioning System (GPS), Global Navigation Satellite System (GLONASS), Galileo system, Indian Regional Navigation Satellite System (IRNASS), and BeiDou Navigation Satellite System (BDS).

21. The apparatus of claim 16, wherein one of the plurality of monitoring devices is configured to be deployed in an oceanic environment.

* * * * *